(12) United States Patent
Chai et al.

(10) Patent No.: US 12,382,505 B2
(45) Date of Patent: Aug. 5, 2025

(54) RANDOM ACCESS PREAMBLE SENDING METHOD AND COMMUNICATION APPARATUS

(71) Applicant: HUAWEI TECHNOLOGIES CO., LTD., Shenzhen (CN)

(72) Inventors: Xiaomeng Chai, Shanghai (CN); Yiqun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 17/512,935

(22) Filed: Oct. 28, 2021

(65) Prior Publication Data

US 2022/0053577 A1 Feb. 17, 2022

Related U.S. Application Data

(63) Continuation of application No. PCT/CN2020/087891, filed on Apr. 29, 2020.

(30) Foreign Application Priority Data

Apr. 30, 2019 (CN) .......................... 201910363256.1

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01); *H04W 74/0866* (2013.01)

(58) Field of Classification Search
CPC ......... H04W 72/0446; H04W 72/0453; H04W 74/006; H04W 74/008; H04W 74/0833;
(Continued)

(56) References Cited

U.S. PATENT DOCUMENTS 8,351,533 B2 * 1/2013 Shrivastava ........ H04W 72/121
375/267
9,036,728 B2 * 5/2015 Shrivastava .......... H04W 72/30
375/267
(Continued)

FOREIGN PATENT DOCUMENTS

CN 101771649 A 7/2010
CN 101854728 A 10/2010
(Continued)

OTHER PUBLICATIONS

Zte et al., On the channel structure of msgA, Apr. 8, 2019, 3GPP TSG RAN WG1 Meeting #96bis, Xi'an, China, Agenda Item: 7.2.1.1, Tdoc: R1-1903878 (Year: 2019).*
(Continued)

*Primary Examiner* — Eric Nowlin
(74) *Attorney, Agent, or Firm* — Maier & Maier, PLLC

(57) ABSTRACT

In the field of communication technologies, a random access preamble sending method and a communication apparatus are provided to avoid a problem that a conflict exists between a PRACH time-frequency resource occupied by a terminal device for sending a random access preamble and a PUSCH time-frequency resource occupied by another terminal device for sending uplink data, and consequently a network device cannot normally receive the random access preamble and the uplink data. The method includes: a terminal device receives configuration information sent by a network device, where the configuration information includes configuration information of a PRACH time-frequency resource set and configuration information of a PUSCH time-frequency resource set. The terminal device determines, in the PRACH time-frequency resource set, a PRACH time-frequency resource that does not conflict with the PUSCH time-frequency resource set. The terminal
(Continued)

device sends a random access preamble on the determined PRACH time-frequency resource.

11 Claims, 9 Drawing Sheets

(51) Int. Cl.
*H04W 72/0453* (2023.01)
*H04W 74/08* (2024.01)

(58) Field of Classification Search
CPC ........... H04W 74/0841; H04W 74/085; H04W 74/0866
See application file for complete search history.

(56) References Cited

U.S. PATENT DOCUMENTS

| | | | | |
|---|---|---|---|---|
| 10,084,582 | B2* | 9/2018 | Ly | H04L 5/0053 |
| 10,313,066 | B2* | 6/2019 | You | H04L 1/1854 |
| 10,425,196 | B2* | 9/2019 | You | H04L 5/0082 |
| 10,469,229 | B2* | 11/2019 | Ly | H04L 5/1469 |
| 10,554,367 | B2* | 2/2020 | Liu | H04L 5/0037 |
| 11,324,053 | B2* | 5/2022 | Svedman | H04W 74/02 |
| 11,784,733 | B2* | 10/2023 | Gao | H04B 7/088 |
| | | | | 370/252 |
| 11,882,073 | B2* | 1/2024 | Ly | H04L 5/0053 |
| 11,917,687 | B2* | 2/2024 | Sahlin | H04W 16/28 |
| 12,052,770 | B2* | 7/2024 | Chai | H04W 72/1263 |
| 12,069,730 | B2* | 8/2024 | Ying | H04W 74/002 |
| 2010/0266057 | A1* | 10/2010 | Shrivastava | H04W 72/30 |
| | | | | 375/260 |
| 2013/0121234 | A1* | 5/2013 | Shrivastava | H04W 72/30 |
| | | | | 370/312 |
| 2014/0348078 | A1* | 11/2014 | Kim | H04L 5/0023 |
| | | | | 370/329 |
| 2017/0231011 | A1 | 8/2017 | Park et al. | |
| 2018/0077696 | A1* | 3/2018 | Lee | H04W 72/02 |
| 2018/0098239 | A1* | 4/2018 | You | H04W 72/12 |
| 2018/0145814 | A1* | 5/2018 | Liu | H04L 5/0053 |
| 2018/0159664 | A1* | 6/2018 | You | H04W 48/12 |
| 2018/0183557 | A1* | 6/2018 | Ly | H04L 5/0051 |
| 2018/0331806 | A1* | 11/2018 | Ly | H04L 5/0051 |
| 2019/0254077 | A1* | 8/2019 | Sahlin | H04L 5/0092 |
| 2020/0236524 | A1* | 7/2020 | Ye | H04L 5/0094 |
| 2020/0236712 | A1* | 7/2020 | Kwak | H04L 5/0053 |
| 2020/0288503 | A1* | 9/2020 | Sahlin | H04L 5/0053 |
| 2020/0304218 | A1* | 9/2020 | Gao | H04B 17/318 |
| 2021/0352734 | A1* | 11/2021 | Svedman | H04W 72/1263 |
| 2021/0378031 | A1* | 12/2021 | Chai | H04W 74/0866 |
| 2021/0385868 | A1* | 12/2021 | Ying | H04W 74/0833 |
| 2022/0039171 | A1* | 2/2022 | Ohara | H04W 74/0833 |
| 2022/0061105 | A1* | 2/2022 | He | H04W 74/008 |
| 2022/0104267 | A1* | 3/2022 | Gao | H04W 72/1268 |
| 2022/0132594 | A1* | 4/2022 | Ren | H04L 5/0051 |
| 2022/0150956 | A1* | 5/2022 | Xiong | H04L 5/0051 |
| 2022/0174750 | A1* | 6/2022 | Ohara | H04L 5/0051 |
| 2022/0272748 | A1* | 8/2022 | Xiong | H04W 1/1812 |
| 2022/0272769 | A1* | 8/2022 | Lei | H04W 74/0866 |
| 2022/0329383 | A1* | 10/2022 | Ly | H04L 5/0053 |
| 2023/0054111 | A1* | 2/2023 | Rudolf | H04W 74/0833 |
| 2024/0064801 | A1* | 2/2024 | Yue | H04W 76/27 |
| 2025/0048420 | A1* | 2/2025 | Ly | H04W 74/0833 |

FOREIGN PATENT DOCUMENTS

| | | | | |
|---|---|---|---|---|
| CN | 106797533 | A | | 5/2017 |
| CN | 109309961 | A | | 2/2019 |
| CN | 111164941 | A | * | 5/2020 ......... H04L 27/2602 |
| CN | 111294937 | A | * | 6/2020 ......... H04W 72/042 |
| CN | 110140320 | B | * | 3/2022 ............... B66B 1/32 |
| CN | 111164941 | B | * | 4/2023 ......... H04L 27/2602 |
| JP | 2011527134 | A | | 10/2011 |
| JP | 2022524706 | A | * | 5/2022 |
| JP | 7238144 | B2 | * | 3/2023 ......... H04W 72/042 |
| KR | 20210126609 | A | * | 10/2021 |
| WO | 2012036409 | A2 | | 3/2012 |
| WO | 2017171847 | A1 | | 10/2017 |
| WO | WO-2017196387 | A1 | * | 11/2017 ......... H04L 27/2602 |
| WO | 2019050381 | A1 | | 3/2019 |
| WO | 2019/069152 | A1 | | 4/2019 |
| WO | WO-2020147577 | A1 | * | 7/2020 ......... H04W 72/042 |
| WO | WO-2020164449 | A1 | * | 8/2020 ......... H04L 5/0048 |

OTHER PUBLICATIONS

Huawei et al., Further discussion on channel structure for 2-step RACH, Apr. 8, 2019, 3GPP TSG RAN WG1 Meeting #96bis, Xi'an, China, Agenda Item: 7.2.1.1, Tdoc: R1-1903923 (Year: 2019).*
Vivo, Discussion on channel structure for 2-step RACH, Apr. 8, 2019, 3GPP TSG RAN WG1 Meeting #96bis, Xi'an, China, Agenda Item: 7.2.1.1, Tdoc: R1-1904059 (Year: 2019).*
LG Electronics, Channel Structure for Two-Step RACH, Apr. 8, 2019, 3GPP TSG RAN WG1 Meeting #96bis, Xi'an, China, Agenda Item: 7.2.1.1, Tdoc: R1-1904196 (Year: 2019).*
Sony, Considerations on Channel Structure for Two-Step RACH, Apr. 8, 2019, 3GPP TSG RAN WG1 Meeting #96bis, Xi'an, China, Agenda Item: 7.2.1.1, Tdoc: R1-1904246 (Year: 2019).*
Intel Corporation, Channel structure for 2-step RACH, Apr. 8, 2019, 3GPP TSG RAN WG1 Meeting #96bis, Xi'an, China, Agenda Item: 7.2.1.1, Tdoc: R1-1904280 (Year: 2019).*
Panasonic, Discussion on channel structure for 2-step RACH, Apr. 8, 2019, 3GPP TSG RAN WG1 Meeting #96bis, Xi'an, China, Agenda Item: 7.2.1.1, Tdoc: R1-1904357 (Year: 2019).*
Samsung, Channel Structure for Two-Step RACH, Apr. 8, 2019, 3GPP TSG RAN WG1 Meeting #96bis, Xi'an, China, Agenda Item: 7.2.1.1, Tdoc: R1-1904392 (Year: 2019).*
Catt, Discussion on Channel Structure for 2-step RACH, Apr. 8, 2019, 3GPP TSG RAN WG1 Meeting #96bis, Xi'an, China, Agenda Item: 7.2.1.1, Tdoc: R1-1904542 (Year: 2019).*
Fujitsu, Discussion on channel structure for Two-Step RACH, Apr. 8, 2019, 3GPP TSG RAN WG1 Meeting #96bis, Xi'an, China, Agenda Item: 7.2.1.1, Tdoc: R1-1904584 (Year: 2019).*
Nokia et al., On 2-step RACH Channel Structure, Apr. 8, 2019, 3GPP TSG RAN WG1 Meeting #96bis, Xi'an, China, Agenda Item: 7.2.1.1, Tdoc: R1-1904715 (Year: 2019).*
CMCC, Discussion on channel structure for two-step RACH, Apr. 8, 2019, 3GPP TSG RAN WG1 Meeting #96bis, Xi'an, China, Agenda Item: 7.2.1.1, Tdoc: R1-1904724 (Year: 2019).*
Spreadtrum communications, Considerations on the channel structure on 2-step RACH, Apr. 8, 2019, 3GPP TSG RAN WG1 Meeting #96bis, Xi'an, China, Agenda Item: 7.2.1.1, Tdoc: R1-1904778 (Year: 2019).*
Sierra Wireless, Channel Structure for Two-Step RACH Considerations, Apr. 8, 2019, 3GPP TSG RAN WG1 Meeting #96bis, Xi'an, China, Agenda Item: 7.2.1.1, Tdoc: R1-1904819 (Year: 2019).*
Ericsson, Channel Structure for Two-Step RACH, Apr. 8, 2019, 3GPP TSG RAN WG1 Meeting #96bis, Xi'an, China, Agenda Item: 7.2.1.1, Tdoc: R1-1904842 (Year: 2019).*
InterDigital Inc., On PUSCH Transmission in msgA, Apr. 8, 2019, 3GPP TSG RAN WG1 Meeting #96bis, Xi'an, China, Agenda Item: 7.2.1.1, Tdoc: R1-1904848 (Year: 2019).*
NTT Docomo, Inc., Discussion on Channel Structure for Two-Step RACH, Apr. 8, 2019, 3GPP TSG RAN WG1 Meeting #96bis, Xi'an, China, Agenda Item: 7.2.1.1, Tdoc: R1-1904944 (Year: 2019).*
Qualcomm Incorporated, Channel Structure for Two-Step RACH, Apr. 8, 2019, 3GPP TSG RAN WG1 Meeting #96bis, Xi'an, China, Agenda Item: 7.2.1.1, Tdoc: R1-1904992 (Year: 2019).*
Itri et al., Discussion on channel structure for 2-Step RACH, Apr. 8, 2019, 3GPP TSG RAN WG1 Meeting #96bis, Xi'an, China, Agenda Item: 7.2.1.1, Tdoc: R1-1905043 (Year: 2019).*
Caict, Considerations on Channel Structure for Two-step RACH, Apr. 8, 2019, 3GPP TSG RAN WG1 Meeting #96bis, Xi'an, China, Agenda Item: 7.2.1.1, Tdoc: R1-1905125 (Year: 2019).*
Zte, Summary of 7.2.1.1 Channel Structure for Two-step RACH , Apr. 8, 2019, 3GPP TSG RAN WG1 Meeting #96bis, Xi'an, China, Agenda Item: 7.2.1.1, Tdoc: R1-1905667 (Year: 2019).*

(56) References Cited

OTHER PUBLICATIONS

Zte, Updated summary of 7.2.1.1 Channel Structure for Two-step RACH , Apr. 8, 2019, 3GPP TSG RAN WG1 Meeting #96bis, Xi'an, China, Agenda Item: 7.2.1.1, Tdoc: R1-1905793 (Year: 2019).*
Interdigital Inc., On RACH Resources for IAB Random Access in NR, 3GPP TSG RAN WG1 Ad-Hoc Meeting 1901, Taipei, Taiwan, Jan. 21-25, 2019, R1-1900791, 3 pages.
3GPP TS 38.213 V15.5.0, "3rd Generation Partnership Project; Technical Specification Group Radio Access Network; NR; Physical layer procedures for control (Release 15)", (Mar. 2019); 104 pages.
3GPP TS 38.211 V15.3.0, "3rd Generation Partnership Project; Technical Specification Group Radio Access Network; NR; Physical channels and modulation (Release 15)", (Sep. 2018), 96 pages.
3GPP TSG RAN WG1 Meeting #96bis R1-1904196, "Channel Structure for Two-Step RACH", LG Electronics, Xi'an, China, Apr. 8-12, 2019; 8 pages.
Ericsson, "PRACH Improvements for Network Robustness", 3GPP TSG-RAN WG1 Meeting #94bis, R1-1811442, Chengdu, China, XP051518845, Oct. 8-12, 2018, 5 pages.

* cited by examiner

RANDOM ACCESS PREAMBLE SENDING METHOD AND COMMUNICATION APPARATUS

CROSS-REFERENCE TO RELATED APPLICATIONS

This application is a continuation of International Application No. PCT/CN2020/087891, filed on Apr. 29, 2020, which claims priority to Chinese Patent Application No. 201910363256.1, filed on Apr. 30, 2019. The disclosures of the aforementioned applications are hereby incorporated by reference in their entireties.

TECHNICAL FIELD

Embodiments relate to the field of communication technologies, and in particular, to a random access preamble sending method and a communication apparatus.

BACKGROUND

Random access (RA) of a terminal device may also be referred to as a random access channel (RACH). In systems such as long term evolution (LTE) and new radio (NR), a terminal device needs to enter an RRC connected mode from a radio resource control (RRC) idle mode or inactive mode by using a random access process, to set up various bearers with a network device and further communicate with the network device. Existing random access is classified into four-step random access and two-step random access. Different from the four-step random access in which a terminal device needs to send a random access preamble and uplink data to a network device by using different steps, in the two-step random access, a terminal device simultaneously sends a random access preamble and uplink data to a network device by using a same step, to reduce a latency and signaling overheads.

However, in the two-step random access, if a physical random access channel (PRACH) time-frequency resource used to carry the random access preamble and a physical uplink shared channel (PUSCH) time-frequency resource used to carry the uplink data are configured in a same slot and overlap in frequency domain, a problem may occur, where the problem is that a conflict exists between a PRACH time-frequency resource occupied by a terminal device for sending a random access preamble and a PUSCH time-frequency resource occupied by another terminal device for sending uplink data, and consequently the network device cannot normally receive the random access preamble and the uplink data.

SUMMARY

Embodiments provide a random access preamble sending method and a communication apparatus, to resolve a problem that a conflict exists between a PRACH time-frequency resource occupied by a terminal device for sending a random access preamble and a PUSCH time-frequency resource occupied by another terminal device for sending uplink data, and consequently a network device cannot normally receive the random access preamble and the uplink data.

According to a first aspect, an embodiment provides a random access preamble sending method, including: a terminal device receives configuration information sent by a network device, where the configuration information includes configuration information of a PRACH time-frequency resource set and configuration information of a PUSCH time-frequency resource set. The terminal device determines, in the PRACH time-frequency resource set, a PRACH time-frequency resource that does not conflict with the PUSCH time-frequency resource set. The terminal device sends a random access preamble on the determined PRACH time-frequency resource. In this embodiment, the terminal device determines, in the PRACH time-frequency resource set, a PRACH time-frequency resource that does not conflict with the PUSCH time-frequency resource set, to send the random access preamble. This avoids a problem that a conflict exists between a PRACH time-frequency resource occupied by a terminal device for sending a random access preamble and a PUSCH time-frequency resource occupied by another terminal device for sending uplink data, and ensures that the network device normally receives the random access preamble and the uplink data.

In a possible implementation, the terminal device uses one of the following manners to determine, in the PRACH time-frequency resource set, a PRACH time-frequency resource that does not conflict with the PUSCH time-frequency resource set: the terminal device determines, in the PRACH time-frequency resource set, a PRACH time-frequency resource that does not overlap the PUSCH time-frequency resource set in time domain; or the terminal device determines, in the PRACH time-frequency resource set, a PRACH time-frequency resource that does not overlap the PUSCH time-frequency resource set in frequency domain. In the foregoing implementation, the PRACH time-frequency resource that is determined in the PRACH time-frequency resource set and that is used to send the random access preamble does not overlap the PUSCH time-frequency resource set in time domain or frequency domain. This avoids a conflict caused by overlapping, in time domain and frequency domain, between a PRACH time-frequency resource occupied by a terminal device for sending a random access preamble and a PUSCH time-frequency resource occupied by another terminal device for sending uplink data.

In a possible implementation, that the terminal device determines, in the PRACH time-frequency resource set, a PRACH time-frequency resource that does not overlap the PUSCH time-frequency resource set in time domain includes: The terminal device determines, in the PRACH time-frequency resource set, a PRACH time-frequency resource that has an interval greater than a first threshold from the PUSCH time-frequency resource set in time domain; and/or that the terminal device determines, in the PRACH time-frequency resource set, a PRACH time-frequency resource that does not overlap the PUSCH time-frequency resource set in frequency domain includes: The terminal device determines, in the PRACH time-frequency resource set, a PRACH time-frequency resource that has an interval greater than a second threshold from the PUSCH time-frequency resource set in time domain and that does not overlap the PUSCH time-frequency resource set in frequency domain. In the foregoing implementation, the PRACH time-frequency resource that is determined in the PRACH time-frequency resource set and that is used to send the random access preamble has the interval greater than the first threshold from the PUSCH time-frequency resource set in time domain, or has the interval greater than the second threshold from the PUSCH time-frequency resource set in time domain and overlaps the PUSCH time-frequency resource set in frequency domain. This avoids the conflict that is between a PRACH time-frequency resource occupied for sending a random access preamble and a PUSCH time-frequency resource occupied for sending uplink data and that is caused by an excessively small interval, in time domain, between the PRACH time-frequency resource and the PUSCH time-frequency resource.

In a possible implementation, before that the terminal device determines, in the PRACH time-frequency resource set, a PRACH time-frequency resource that has an interval greater than a first threshold from the PUSCH time-frequency resource set in time domain; or that the terminal device determines, in the PRACH time-frequency resource set, a PRACH time-frequency resource that has an interval greater than a second threshold from the PUSCH time-frequency resource set in time domain and that does not overlap the PUSCH time-frequency resource set in frequency domain, the method further includes: the terminal device determines that a subcarrier spacing of the PRACH time-frequency resource set is different from a subcarrier spacing of the PUSCH time-frequency resource set. In the foregoing implementation, when the subcarrier spacing of the PRACH time-frequency resource set and the subcarrier spacing of the PUSCH time-frequency resource set are the same or different, different conditions are used to select, from the PRACH time-frequency resource set, the PRACH time-frequency resource for sending a random access preamble, so that the selection of the PRACH time-frequency resource for sending the random access preamble may be implemented under the different conditions. This avoids the conflict between a PRACH time-frequency resource occupied by a terminal device for sending a random access preamble and a PUSCH time-frequency resource occupied by another terminal device for sending uplink data.

According to a second aspect, an embodiment provides a random access preamble sending method, including: a terminal device receives configuration information sent by a network device, where the configuration information includes configuration information of a PRACH time-frequency resource set. The terminal device receives indication information sent by the network device, where the indication information is used to indicate one or more valid PRACH time-frequency resources in the PRACH time-frequency resource set. The terminal device sends a random access preamble on one of the valid PRACH time-frequency resources. In this application, the terminal device sends the random access preamble on one of the valid PRACH time-frequency resources in the PRACH time-frequency resource set indicated by the network device. This avoids a conflict between the PRACH time-frequency resource occupied by the terminal device for sending the random access preamble and another service of the network device.

In a possible implementation, the indication information includes a first bitmap, an index number, or a parameter N, where the first bitmap is used to indicate time-domain distribution of one or more valid PRACH time-frequency resources in a same PRACH slot in the PRACH time-frequency resource set; the parameter N is used to indicate that in one or more PRACH time-frequency resources in a same PRACH slot in the PRACH time-frequency resource set, first N or last N PRACH time-frequency resources in time domain are valid or invalid; and the index number is used to indicate an entry in a PRACH time-frequency resource table, and any entry in the PRACH time-frequency resource table is used to define a PRACH time-frequency resource that is valid in time domain and that is in one or more PRACH time-frequency resources in a same PRACH slot in the PRACH time-frequency resource set. In the foregoing implementation, implementation of the indication information is enriched, so that indication information including corresponding information is selected based on a communication system and a communication condition, to indicate the valid PRACH time-frequency resources in the PRACH time-frequency resource set.

In a possible implementation, the indication information includes a second bitmap or a parameter K, where the second bitmap is used to indicate time-domain distribution of one or more valid PRACH slots occupied by one or more PRACH time-frequency resources in a same radio frame in the PRACH time-frequency resource set; and the parameter K is used to indicate that in one or more PRACH slots occupied by one or more PRACH time-frequency resources in a same radio frame in the PRACH time-frequency resource set, first K or last K PRACH slots in time domain are valid or invalid. In the foregoing implementation, the implementation of the indication information is enriched, so that the indication information including the corresponding information is selected based on the communication system and the communication condition, to indicate the valid PRACH time-frequency resources in the PRACH time-frequency resource set.

According to a third aspect, an embodiment provides a communication apparatus. The apparatus has a function of implementing the method in any one of the first aspect or the possible implementations of the first aspect or performing the method in any one of the second aspect or the possible implementations of the second aspect. The function may be implemented by hardware or may be implemented by hardware by executing corresponding software. The hardware or the software includes one or more modules corresponding to the foregoing function.

In a possible implementation, the apparatus may be a chip or an integrated circuit.

In a possible implementation, the apparatus includes a memory and a processor. The memory is configured to store a program executed by the processor. When the program is executed by the processor, the apparatus may perform the method according to any one of the first aspect or the possible implementations of the first aspect or perform the method according to any one of the second aspect or the possible implementations of the second aspect.

In a possible implementation, the apparatus may be a terminal device.

According to a fourth aspect, an embodiment provides a computer-readable storage medium, where the storage medium stores computer instructions, and when the computer instructions are executed by a terminal device, the terminal device is enabled to perform the method in any one of the first aspect or the possible implementations of the first aspect, or perform the method in any one of the second aspect or the possible implementations of the second aspect.

According to a fifth aspect, an embodiment provides a computer program product including instructions. When the computer program product runs on a terminal device, the terminal device is enabled to perform the method in any one of the first aspect or the possible implementations of the first aspect or perform the method in any one of the second aspect or the possible implementations of the second aspect.

DETAILED DESCRIPTION OF THE EMBODIMENTS

The following describes in detail the embodiments with reference to the accompanying drawings.

Figure 1:
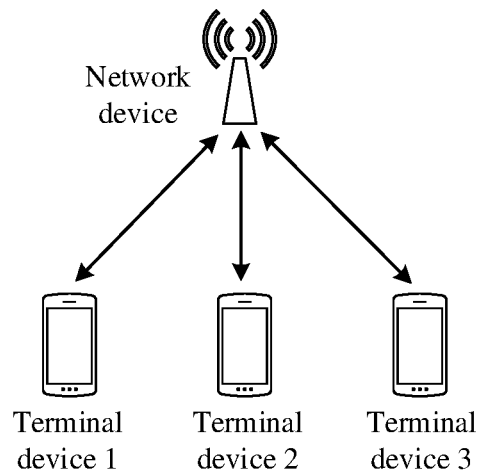
FIG. 1 is a schematic diagram of a communication architecture according to an embodiment.

Solutions in the embodiments may be used in various communication systems such as a 5G system, an NR system, an LTE system, and a long term evolution-advanced (LTE-A) system, and may further be used in a wireless fidelity (Wi-Fi) system, a worldwide interoperability for microwave access (wimax) system, a related cellular system such as a 3GPP system, and a future communication system such as a 6G system. For example, an architecture of a communication system used in the embodiments may be shown in FIG. 1 and includes a network device and a plurality of terminal devices. In FIG. 1, three terminal devices are used as an example. A terminal device 1 to a terminal device 3 may separately or simultaneously send data to the network device. It should be noted that a quantity of terminal devices and a quantity of network devices in the communication system shown in FIG. 1 are not limited in the embodiments.

In addition, it should be understood that the term "for example" in the embodiments is used to represent giving an example, an illustration, or a description. Any embodiment or design scheme described as an "example" in the embodiments should not be explained as being more preferred or having more advantages than another embodiment or design scheme. In other words, "for example" is used to present a concept in a specific manner.

The terms "include/comprise" and "have" in the embodiments, claims, and accompanying drawings are not exclusive. For example, a process, a method, a system, a product, or a device that includes a series of steps or modules is not limited to the enumerated steps or modules, and may further include a step or module that is not enumerated. The terms "system" and "network" may be used interchangeably in the embodiments. The term "and/or" in the embodiments describes only an association relationship for describing associated objects and represents that three relationships may exist. For example, A and/or B may represent three cases: there is only A, there are both A and B, and there is only B. In addition, the character "/" in the embodiments usually indicates an "or" relationship between the associated objects. It should be understood that in the embodiments, "B corresponding to A" indicates that B is associated with A, and B may be determined according to A. However, it should further be understood that determining B according to A does not mean that B is determined according to A only, that is, B may also be determined according to A and/or other information. In addition, unless otherwise stated, in the embodiments, ordinal numbers such as "first" and "second" are used to distinguish between a plurality of objects, and are not intended to limit an order, a time sequence, a priority, or importance of the plurality of objects. In addition, the terms "include/comprise" and "have" in the embodiments, the claims, and the accompanying drawings are not exclusive. For example, a process, a method, a system, a product, or a device that includes a series of steps or modules is not limited to the enumerated steps or modules, and may further include a step or module that is not enumerated. "A plurality of" in the embodiments means two or more.

In addition, in the embodiments, information, a signal, a message, and a channel may be interchangeably used sometimes. It should be noted that meanings expressed by the terms are consistent when differences are not emphasized. Of, "relevant", and "corresponding" may be interchangeably used sometimes. It should be noted that meanings expressed by the terms are consistent when differences between the terms are not emphasized.

Before the embodiments are described, some terms are first described, to help a person of ordinary skill in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device communication (D2D) terminal device, a V2X terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, and the like. For example, the terminal is a personal communications service (PCS) phone, a cordless telephone set, a session initiation protocol (SIP) phone, a wireless local loop (WLL) station, or a personal digital assistant (PDA). The terminal apparatus further includes a limited device, for example, a device with relatively low power consumption, a device with a limited storage capability, or a device with a limited computing capability. For example, the terminal apparatus includes an information sensing device such as a bar code, radio frequency identification (RFID), a sensor, a global positioning system (GPS), or a laser scanner.

By way of example and not limitation, the terminal device in the embodiments may alternatively be a wearable device. The wearable device may also be referred to as a wearable intelligent device, an intelligent wearable device, or the like, and is a general term for wearable devices that are developed by using a wearable technology to perform intelligent design on daily wear, for example, glasses, gloves, a watch, clothes, and shoes. The wearable device is a portable device that is directly worn on a body or integrated into clothes or an accessory of the user. The wearable device is not only a hardware device but is used to implement a powerful function through software support, a data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal device is also referred to as an on board unit (OBU).

In the embodiments, the terminal device may further include a relay. Alternatively, it may be understood that any device that can perform data communication with a base station may be considered as the terminal device.

(2) A network device may be a device that is in an access network and that communicates with a wireless terminal device over an air interface through one or more cells. The network device may be a node in the radio access network, and may also be referred to as a base station, or may be referred to as a radio access network (RAN) node (or device). Currently, some examples of network devices are a gNB, a transmission reception point (transmission reception point, TRP), an evolved NodeB (eNB), a radio network controller (radio network controller, RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), and the like. In addition, in a network structure, the network device may include a centralized unit (CU) node and a distributed unit (DU) node. In this structure, protocol layers of an eNB in a long term evolution (LTE) system are split, where functions of some protocol layers are centrally controlled by the CU, functions of some or all of remaining protocol layers are distributed in the DU, and the CU centrally controls the DU.

(3) A PRACH time-frequency resource, also referred to as a PRACH occasion (RO), is a time-frequency resource unit used to send a random access preamble. The random access preamble may also be a preamble for short in subsequent descriptions. Currently, there are 13 types of preamble formats, which are classified, based on lengths, into two categories: 839 and 139, as shown in Table (table) 6.3.3.1-1 and Table 6.3.3.1-2 in the 3GPP standard document 3GPP TS 38.211 V15.3.0. Format represents a preamble type, $L_{RA}$ represents a preamble sequence length, $\Delta f^{RA}$ represents a PRACH time-frequency resource subcarrier spacing, and $N_u$ and $N_{CP}^{RA}$ are respectively a time domain length of a preamble and a time domain length of a cyclic prefix (cyclic prefix, CP). The preamble includes a CP whose length is Tcp and a sequence (Sequence) whose length is Tseq.

Table 6.3.3.1-1: Preamble types when the preamble sequence length type is 839 and the PRACH time-frequency resource subcarrier spacing is 2.25 kHz or 5 kHz (PRACH preamble formats for $L_{RA}=839$ and $\Delta f^{RA} \in \{1.25,5\}$ kHz).

TABLE 6.3.3.1-1

| Format | $L_{RA}$ | $\Delta f^{RA}$ | $N_u$ | $N^{RA}_{CP}$ |
|---|---|---|---|---|
| 0 | 839 | 1.25 kHz | 24576κ | 3168κ |
| 1 | 839 | 1.25 kHz | 2·24576κ | 2·21024κ |
| 2 | 839 | 1.25 kHz | 4·24576κ | 4688κ |
| 3 | 839 | 5 kHz | 4·6144κ | 3168κ |

Table 6.3.3.1-2: Preamble types when the preamble sequence length type is 139 and the PRACH time-frequency resource subcarrier spacing is $15 \cdot 2^\mu$ kHz, where $\mu \in \{0,1,2,3\}$.

TABLE 6.3.3.1-2

| Format | $L_{RA}$ | $\Delta f^{RA}$ | $N_u$ | $N^{RA}_{CP}$ |
|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ |
| A2 | 139 | $15 \cdot 2^\mu$ kHz | $4 \cdot 2048\kappa \cdot 2^{-\mu}$ | $576\kappa \cdot 2^{-\mu}$ |
| A3 | 139 | $15 \cdot 2^\mu$ kHz | $6 \cdot 2048\kappa \cdot 2^{-\mu}$ | $864\kappa \cdot 2^{-\mu}$ |
| B1 | 139 | $15 \cdot 2^\mu$ kHz | $2 \cdot 2048\kappa \cdot 2^{-\mu}$ | $216\kappa \cdot 2^{-\mu}$ |
| B2 | 139 | $15 \cdot 2^\mu$ kHz | $4 \cdot 2048\kappa \cdot 2^{-\mu}$ | $360\kappa \cdot 2^{-\mu}$ |
| B3 | 139 | $15 \cdot 2^\mu$ kHz | $6 \cdot 2048\kappa \cdot 2^{-\mu}$ | $504\kappa \cdot 2^{-\mu}$ |
| B4 | 139 | $15 \cdot 2^\mu$ kHz | $12 \cdot 2048\kappa \cdot 2^{-\mu}$ | $936\kappa \cdot 2^{-\mu}$ |
| C0 | 139 | $15 \cdot 2^\mu$ kHz | $2048\kappa \cdot 2^{-\mu}$ | $1248\kappa \cdot 2^{-\mu}$ |
| C2 | 139 | $15 \cdot 2^\mu$ kHz | $4 \cdot 2048\kappa \cdot 2^{-\mu}$ | $2048\kappa \cdot 2^{-\mu}$ |

A time-domain resource configuration of the PRACH occasion is determined based on a parameter, namely a PRACH configuration index, configured by the network device, and Table 6.3.3.2-2 to 6.3.3.2-4 in the 3GPP standard document 3GPP TS 38.211 V15.3.0. There are three tables based on a carrier frequency and a duplex mode, and each table has 256 configurations. Only a portion of a table is used for explanation herein.

Table 6.3.3.2-2: Uplink random access configurations when a corresponding frequency range is FR1 (Random access configurations for FR1 and paired spectrum/supplementary uplink).

TABLE 6.3.3.2-2

| PRACH Configuration Index | | 0 | ... | 87 |
|---|---|---|---|---|
| Preamble format | | 0 | | A1 |
| $n_{SFN}$ mod x = y | y | 16 | | 16 |
| | x | 1 | | 0 |
| Subframe number | | 1 | | 4, 9 |
| Starting symbol | | 0 | | 0 |

TABLE 6.3.3.2-2-continued

| PRACH Configuration Index | 0 | ... | 87 |
|---|---|---|---|
| Number of PRACH slots within a subframe | - | | 1 |
| $N^{RA,slot}_t$, number of time-domain PRACH occasions within a PRACH slot | - | | 6 |
| $N^{RA}_{dur}$, PRACH duration | 0 | | 2 |

Referring to Table 6.3.3.2-2, when PRACH Configuration Index configured by the network device is 87, correspondingly, in subframes 4 and 9 of all radio frames whose frame numbers each mod 16 produce a remainder of 0 (mod 16=0), starting from a symbol 0, there is only one PRACH slot in one subframe, each PRACH slot has six consecutive PRACH occasions, and each PRACH occasion occupies two symbols.

(4) In a 5G NR frame structure, 5G NR supports a plurality of types of subcarrier spacings. However, in different subcarrier spacing configurations, a length of a radio frame and a length of a subframe are the same. The length of the radio frame is 10 ms, and the length of the subframe is 1 ms.

A slot length in each subframe varies with a subcarrier spacing. Generally, the slot length decreases as the subcarrier spacing increases. Therefore, subframes include different quantities of slots. In a case of a normal cyclic prefix (CP), slots include a same quantity of symbols, and each slot includes 14 symbols.

For example, when the subcarrier spacing is set to 15 kHz (a normal CP), one radio frame includes 10 subframes, and each subframe includes only one slot. Therefore, the radio frame includes 10 slots. In other words, a sequence number of a subframe is the same as a sequence number of a slot, and the subframe and the slot may be replaced with each other. Each slot includes 14 OFDM symbols (sequence numbers of the OFDM symbols in each slot are respectively #0 to #13).

It should be noted that, all sequence numbers in the embodiments may also be understood as numbers or indexes.

For another example, when the subcarrier spacing is configured to 30 kHz (a normal CP), one radio frame includes 10 subframes, and each subframe includes only two slots. Therefore, the radio frame includes 20 slots. Each slot includes 14 OFDM symbols (sequence numbers of the OFDM symbols in each slot are respectively #0 to #13). In addition, it should be understood that, when not conflicting with the embodiments, all symbols in the embodiments are indicated as OFDM symbols.

A PRACH slot is a slot including a PRACH time-frequency resource. When a spectrum range is FR1 (Frequency range 1), the PRACH slot is obtained through division based on an assumption that the subcarrier spacing is 15 kHz. In other words, one subframe is one PRACH slot. When a spectrum range is FR2, the PRACH slot is obtained through division based on an assumption that the subcarrier spacing is 60 kHz. In other words, one slot in which the subcarrier spacing is 60 kHz is one PRACH slot.

Figure 2:
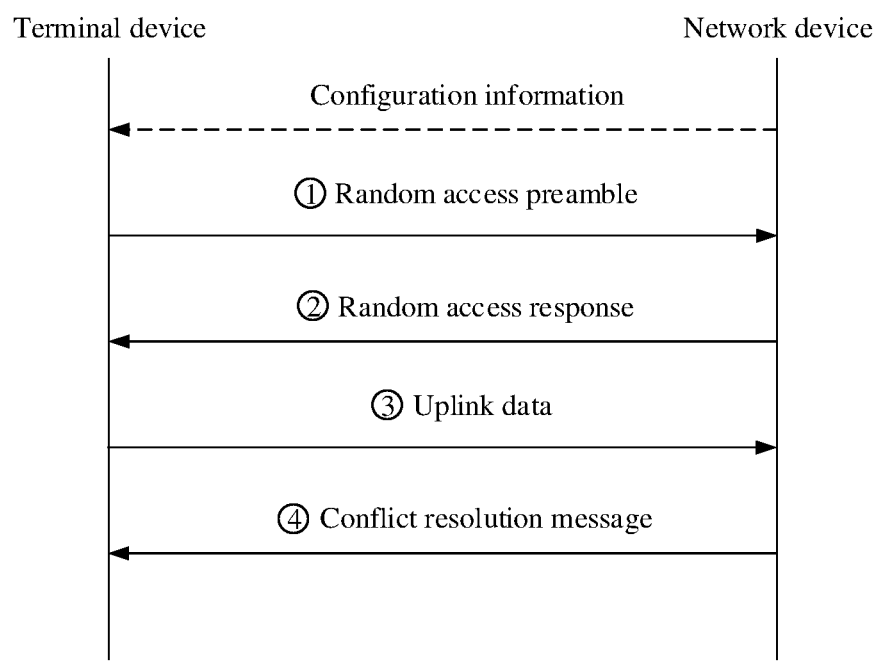
FIG. 2 is a first schematic flowchart of a random access process according to an embodiment.

(5) Random access (RA) is classified into four-step random access and two-step random access. FIG. 2 is a schematic diagram of a four-step random access process. A terminal device receives configuration information sent by a network device and determines a PRACH time-frequency resource based on the configuration information. Step 1: The terminal device sends a random access preamble to the network device on a determined PRACH time-frequency resource. Step 2: After receiving the random access preamble, the network device sends a random access response (RAR) to the terminal device, where the random access response may include parameters such as the random access preamble, an uplink data timing advance, configuration information of an uplink resource used to send uplink data, and a temporary cell radio network temporary identifier (C-RNTI). Step 3: The terminal device receives the random access response, and if a random access preamble indicated by a sequence number of the random access preamble in the random access response is the same as the random access preamble sent by the terminal device to the network device in step 1, the terminal device determines that the random access response is for the terminal device, and the terminal device sends the uplink data to the network device based on an indication of the random access response, for example, sends the uplink data on a PUSCH time-frequency resource. Step 4: The network device receives the uplink data sent by the terminal device and sends a conflict resolution message (which may also be referred to as a contention resolution message) to the terminal device. The network device includes a unique identifier in the conflict resolution message to specify a terminal device whose access is successful, and another terminal device whose access is unsuccessful initiates random access again.

Figure 3:
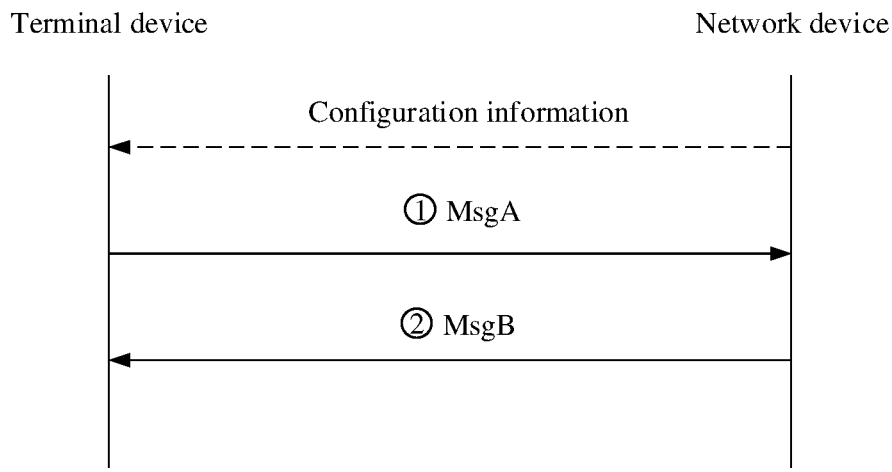
FIG. 3 is a second schematic flowchart of a random access process according to an embodiment.

FIG. 3 is a schematic diagram of a two-step random access process. A terminal device receives configuration information sent by a network device and determines a PRACH time-frequency resource and a PUSCH time-frequency resource based on the configuration information. Step 1: The terminal device sends a message A (MsgA) to the network device, where the MsgA includes a random access preamble and uplink data, the random access preamble is transmitted on a determined PRACH time-frequency resource, and the uplink data is transmitted on a determined PUSCH time-frequency resource. In an embodiment, this step is equivalent to step 1 and step 3 in the four-step random access process. After receiving the MsgA sent by the terminal device, the network device sends a MsgB to the terminal device, where the MsgB may be used to send a random access response and/or information that is used for conflict resolution. This step is equivalent to step 2 and step 4 in the four-step random access.

For the four-step random access, the terminal device in an idle mode or an inactive mode needs to complete at least four times of signaling interworking to enter an RRC connected mode to communicate with the network device. For an ultra-reliable and low-latency communications (URLLC) service, four times of signaling interworking cause a relatively high latency, and this is not beneficial to a URLLC low-latency requirement. For a massive machine-type communications (mMTC) service, because most services are sporadic small packets, the terminal device can send data once only after performing one time of complete four-step random access each time to enter the RRC connected mode, and then the terminal device returns to the idle mode or the inactive mode again. This not only results in a relatively high latency, but also causes relatively high signaling overheads. A quantity of times of signaling interworking required by the two-step random access is reduced, thereby reducing signaling overheads and a latency. This is applicable to an application scenario that has a low latency requirement.

However, for the two-step random access, if a PRACH time-frequency resource and a PUSCH time-frequency resource are located in a same slot, a problem may occur, where the problem is that a conflict exists between a PRACH time-frequency resource occupied by a terminal device for sending a random access preamble and a PUSCH time-frequency resource occupied by another terminal device for sending uplink data, and consequently the network device cannot receive the random access preamble and the uplink data. The embodiments are intended to resolve a problem of how to configure a PRACH time-frequency resource for sending a random access preamble during the existing two-step random access, to avoid a problem that the PRACH time-frequency resource and the PUSCH time-frequency resource are located in the same slot and consequently the conflict exists between a PRACH time-frequency resource occupied by a terminal device for sending a random access preamble and a PUSCH time-frequency resource occupied by another terminal device for sending the uplink data.

The following describes in detail the embodiments with reference to the accompanying drawings.

Embodiment 1

Figure 4:
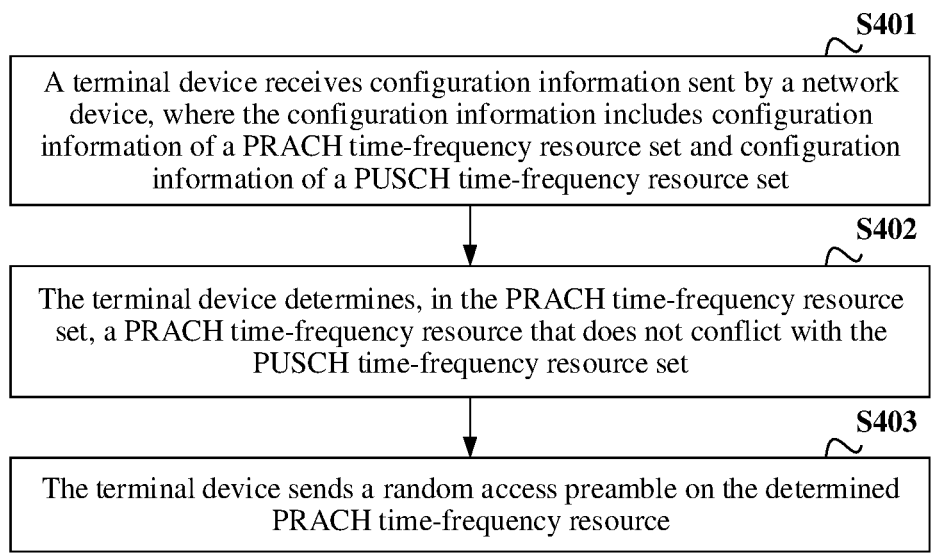
FIG. 4 is a first schematic diagram of a random access preamble sending process according to an embodiment.

FIG. 4 is a schematic diagram of a random access preamble sending process according to an embodiment. The process includes the following steps.

S401: A terminal device receives configuration information sent by a network device, where the configuration information includes configuration information of a PRACH time-frequency resource set and configuration information of a PUSCH time-frequency resource set.

The PRACH time-frequency resource set includes at least one PRACH time-frequency resource, and the PUSCH time-frequency resource includes at least one PUSCH time-frequency resource.

In the embodiments, a PRACH time-frequency resource may also be referred to as a PRACH occasion (RO), and a PUSCH time-frequency resource may also be referred to as a PUSCH occasion (PO). The PRACH time-frequency resource set is a set including one or more PRACH time-frequency resources. The PUSCH time-frequency resource set is a set including one or more PUSCH time-frequency resources.

For example, the network device may send the configuration information to the terminal device by using a broadcast or multicast message, an RRC message, or the like. After receiving the configuration information sent by the network device, the terminal device configures the PRACH time-frequency resource set and the PUSCH time-frequency resource set based on the configuration information.

For example, the configuration information of the PRACH time-frequency resource set may include time-domain distribution information of the PRACH time-frequency resources and frequency-domain distribution information of the PRACH time-frequency resources, and the configuration information of the PUSCH time-frequency resource set may also include time-domain distribution information of the PUSCH time-frequency resources and frequency-domain distribution information of the PUSCH time-frequency resources. The time-domain distribution information of the PRACH time-frequency resources is used as an example. The time-domain distribution information of the PRACH time-frequency resources may be a value of PRACH Configuration Index. If the value of PRACH Configuration Index is 87, the terminal device searches Table 6.3.3.2-2, and determines that time-domain distribution of the PRACH time-frequency resources is that, in subframes 4 and 9 of a radio frame whose frame number mod 16 produces a remainder of 0, starting from a symbol 0, there is one PRACH slot in one subframe, each PRACH slot has six consecutive PRACH time-frequency resources, and each PRACH time-frequency resource occupies two symbols. Based on time-domain distribution of the PRACH time-frequency resources and frequency-domain distribution of the PRACH time-frequency resources, the terminal device may determine the PRACH time-frequency resources in the PRACH time-frequency resource set from two dimensions: time domain and frequency domain. Similarly, based on time-domain distribution of the PUSCH time-frequency resources and frequency-domain distribution of the PUSCH time-frequency resources, the terminal device may also determine the PUSCH time-frequency resources in the PUSCH time-frequency resource set from the two dimensions: time domain and frequency domain.

Further, the configuration information of the PUSCH time-frequency resource set may alternatively include time-domain information and frequency-domain information of each PUSCH time-frequency resource in the PUSCH time-frequency resource set. Based on the time-domain information and the frequency-domain information of each PUSCH time-frequency resource, the terminal device may determine the PUSCH time-frequency resources in the PUSCH time-frequency resource set from the two dimensions: time-frequency and frequency domain.

In the embodiments, content of the configuration information of the PRACH time-frequency resource set and content of the configuration information of the PUSCH time-frequency resource set are not limited, provided that the terminal device can be indicated to determine the PRACH time-frequency resources in the PRACH time-frequency resource set and the PUSCH time-frequency resources in the PUSCH time-frequency resource set.

S402: The terminal device determines, in the PRACH time-frequency resource set, a PRACH time-frequency resource that does not conflict with the PUSCH time-frequency resource set.

S403: The terminal device sends a random access preamble on the determined PRACH time-frequency resource.

Both the PRACH time-frequency resource and the PUSCH time-frequency resource include the two dimensions: time domain and frequency domain. If the PRACH time-frequency resource does not conflict with the PUSCH time-frequency resource in either of time domain and frequency domain, the PRACH time-frequency resource does not conflict with the PUSCH time-frequency resource.

(Implementation 1)

Therefore, in an implementation, the terminal device may select a PRACH time-frequency resource that does not overlap the PUSCH time-frequency resource set in time domain as the PRACH time-frequency resource for sending (carrying) the random access preamble or may select a PRACH time-frequency resource that does not overlap the PUSCH time-frequency resource set in frequency domain as the PRACH time-frequency resource for sending the random access preamble. The following provides descriptions with reference to the two dimensions: time domain and frequency domain.

Time domain dimension:

The terminal device determines, in the PRACH time-frequency resource set, a PRACH time-frequency resource that does not overlap the PUSCH time-frequency resource set in time domain and uses the PRACH time-frequency resource as the PRACH time-frequency resource for sending the random access preamble.

Figure 5:
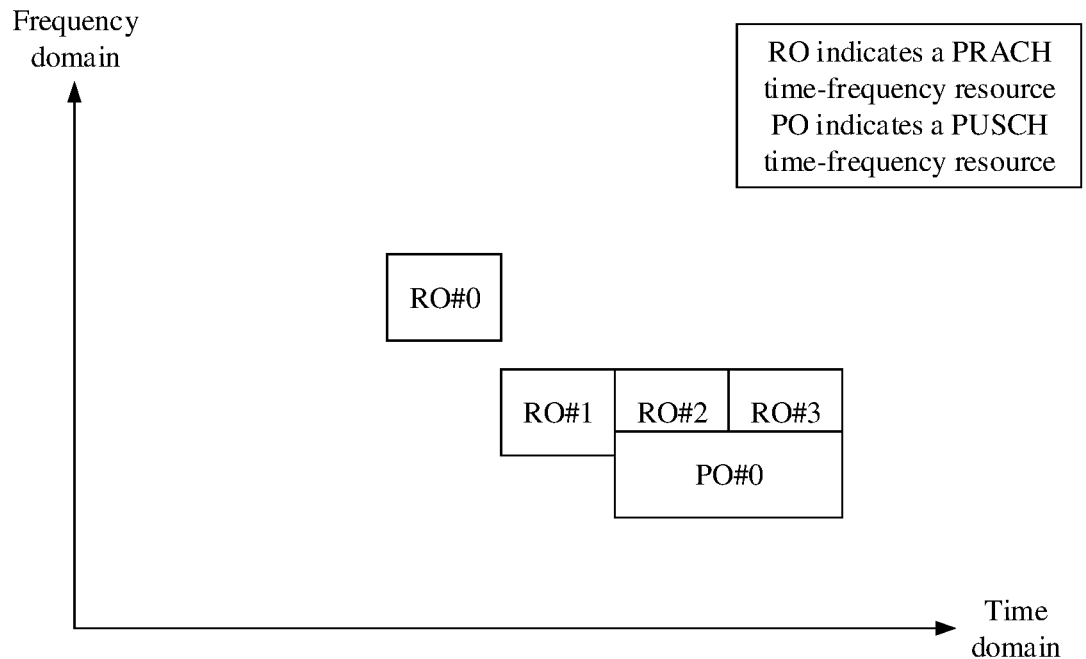
FIG. 5 is a first schematic diagram of distribution of a PRACH time-frequency resource and a PUSCH time-frequency resource according to an embodiment.

It should be noted that, that the PRACH time-frequency resource does not overlap the PUSCH time-frequency resource set in time domain means that the PRACH time-frequency resource does not overlap any PUSCH time-frequency resource in the PUSCH time-frequency resource set in time domain. For example, as shown in FIG. 5, that the PRACH time-frequency resource does not overlap the PUSCH time-frequency resource in time domain includes two cases: The PRACH time-frequency resource does not overlap the PUSCH time-frequency resource in both time domain and frequency domain (for example, RO #0 and PO #0). The PRACH time-frequency resource does not overlap the PUSCH time-frequency resource in time domain and overlaps the PUSCH time-frequency resource in frequency domain (for example, RO #1 and PO #0). That the PRACH time-frequency resource overlaps the PUSCH time-frequency resource in frequency domain includes: The PRACH time-frequency resource completely overlaps and partially overlaps the PUSCH time-frequency resource in frequency domain.

In a possible implementation, the terminal device may select a PRACH time-frequency resource from the PRACH time-frequency resource set, and determine whether the selected PRACH time-frequency resource overlaps the PUSCH time-frequency resource set in time domain, and if not, determines the selected PRACH time-frequency resource as the PRACH time-frequency resource for sending the random access preamble; or if yes, reselects a PRACH time-frequency resource from unselected PRACH time-frequency resources in the PRACH time-frequency resource set, and returns to the step of determining whether the selected PRACH time-frequency resource overlaps the PUSCH time-frequency resource set in time domain, until the selected PRACH time-frequency resource does not overlap the PUSCH time-frequency resource set in time domain and the terminal device determines the selected PRACH time-frequency resource as the PRACH time-frequency resource for sending the random access preamble.

The terminal device may randomly select a PRACH time-frequency resource from the PRACH time-frequency resource set or may select a PRACH time-frequency resource according to a specific policy. For example, according to a policy that a PRACH time-frequency resource with a smallest time interval from current time of the terminal device takes precedence, the terminal device selects, from the PRACH time-frequency resource set, the PRACH time-frequency resource with the smallest time interval from the current time of the terminal device.

In another possible implementation, the terminal device may first determine all PRACH time-frequency resources that are in the PRACH time-frequency resource set and that do not overlap the PUSCH time-frequency resource set in time domain; and then select a PRACH time-frequency resource from all the determined PRACH time-frequency resources that are in the PRACH time-frequency resource set and that do not overlap the PUSCH time-frequency resource set in time domain, and determine the PRACH time-frequency resource as the PRACH time-frequency resource for sending the random access preamble.

Figure 6:
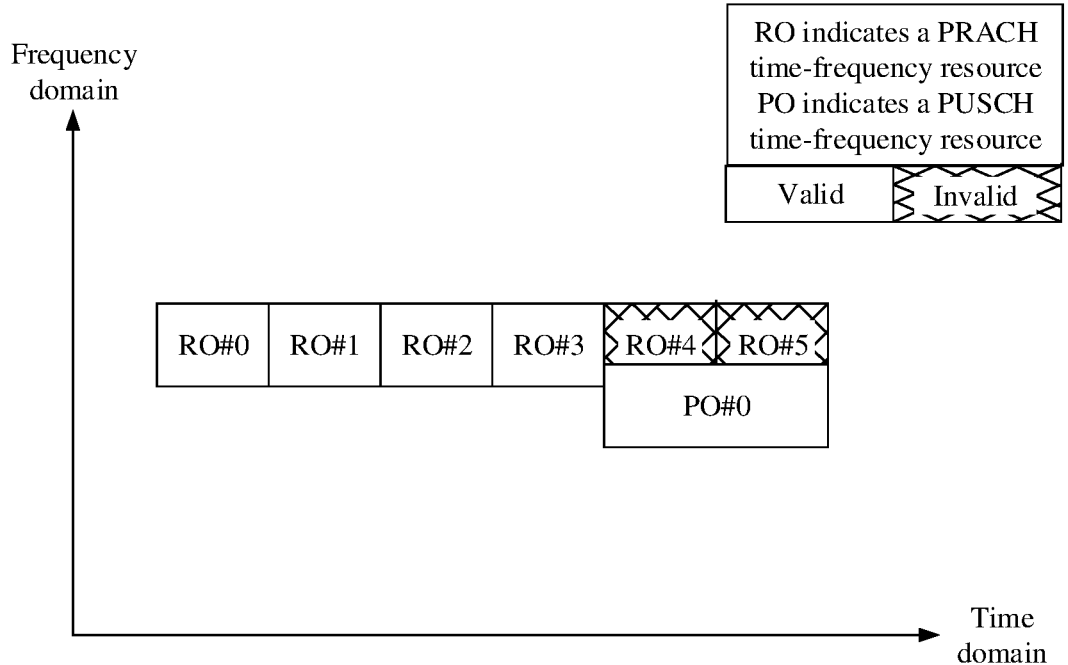
FIG. 6 is a second schematic diagram of distribution of a PRACH time-frequency resource and a PUSCH time-frequency resource according to an embodiment.

For example, descriptions are provided by using an example in which six PRACH time-frequency resources configured by the network device in one PRACH slot form a PRACH time-frequency resource set, and one PUSCH time-frequency resource configured by the network device forms a PUSCH time-frequency resource. As shown in FIG. 6, the six PRACH time-frequency resources are respectively RO #0 to RO #5, and the one PUSCH time-frequency resource is PO #0. RO #4 and RO #5 overlap PO #0 in time domain and cannot be determined as PRACH time-frequency resources for sending the random access preamble. When determining a PRACH time-frequency resource that does not overlap the PUSCH time-frequency resource set in time domain and using the PRACH time-frequency resource as the PRACH time-frequency resource for sending the random access preamble, the terminal device may select a PRACH time-frequency resource, such as RO #0, from RO #0 to RO #5, where RO #0 does not overlap PO #0 in time domain, and determine RO #0 as the PRACH time-frequency resource for sending the random access preamble. Alternatively, the terminal device may first determine, in RO #0 to RO #5, PRACH time-frequency resources that do not overlap PO #0 in time domain, that is, RO #0 to RO #3; and then select a PRACH time-frequency resource from RO #0 to RO #3 and determine the PRACH time-frequency resource as the PRACH time-frequency resource for sending the random access preamble.

Frequency Domain Dimension:

The terminal device determines, in the PRACH time-frequency resource set, a PRACH time-frequency resource that does not overlap the PUSCH time-frequency resource set in frequency domain and uses the PRACH time-frequency resource as the PRACH time-frequency resource for sending the random access preamble.

It should be noted that, that the PRACH time-frequency resource does not overlap the PUSCH time-frequency resource set in frequency domain means that the PRACH time-frequency resource does not overlap any PUSCH time-frequency resource in the PUSCH time-frequency resource set in frequency domain. That the PRACH time-frequency resource does not overlap the PUSCH time-frequency resource in frequency domain includes two cases: The PRACH time-frequency resource does not overlap the PUSCH time-frequency resource in both frequency domain and time domain. The PRACH time-frequency resource does not overlap the PUSCH time-frequency resource in frequency domain and overlaps the PUSCH time-frequency resource in time domain That the PRACH time-frequency resource overlaps the PUSCH time-frequency resource in time domain includes complete overlapping in time domain and partial overlapping in time domain.

In a possible implementation, the terminal device may select a PRACH time-frequency resource from the PRACH time-frequency resource set, and determine whether the selected PRACH time-frequency resource overlaps the PUSCH time-frequency resource set in frequency domain, and if not, determines the selected PRACH time-frequency resource as the PRACH time-frequency resource for sending the random access preamble; or if yes, reselects a PRACH time-frequency resource from unselected PRACH time-frequency resources in the PRACH time-frequency resource set, and returns to the step of determining whether the selected PRACH time-frequency resource overlaps the PUSCH time-frequency resource set in frequency domain, until the selected PRACH time-frequency resource does not overlap the PUSCH time-frequency resource set in frequency domain and the terminal device determines the selected PRACH time-frequency resource as the PRACH time-frequency resource for sending the random access preamble. For a manner in which the terminal device selects the PRACH time-frequency resource from the PRACH time-frequency resource set, refer to related descriptions in the time domain dimension. Details are not described again.

In another possible implementation, the terminal device may first determine all PRACH time-frequency resources that are in the PRACH time-frequency resource set and that do not overlap the PUSCH time-frequency resource set in frequency domain; and then select a PRACH time-frequency resource from all the determined PRACH time-frequency resources that are in the PRACH time-frequency resource set and that do not overlap the PUSCH time-frequency resource set in frequency domain, and determine the PRACH time-frequency resource as the PRACH time-frequency resource for sending the random access preamble.

Figure 7:
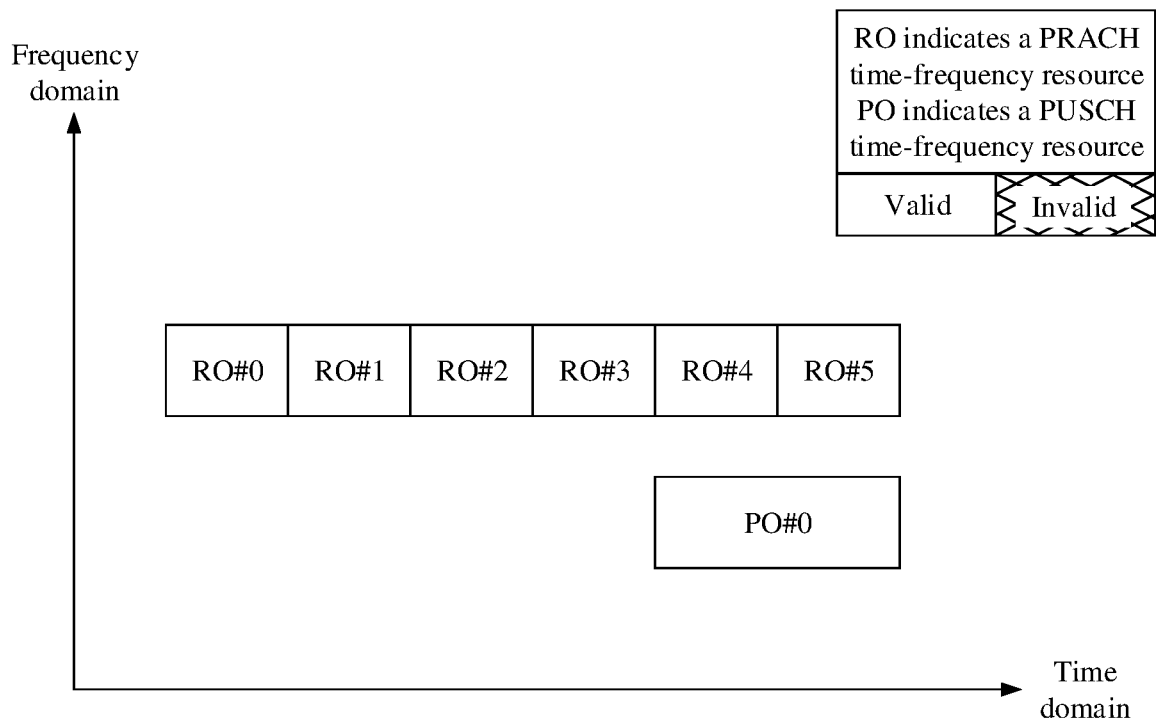
FIG. 7 is a third schematic diagram of distribution of a PRACH time-frequency resource and a PUSCH time-frequency resource according to an embodiment.

For example, descriptions are provided by using an example in which six PRACH time-frequency resources configured by the network device in one PRACH slot form a PRACH time-frequency resource set, and one PUSCH time-frequency resource configured by the network device forms a PUSCH time-frequency resource. As shown in FIG. 7, the six PRACH time-frequency resources are respectively RO #0 to RO #5, and the one PUSCH time-frequency resource is PO #0. None of RO #0 to RO #5 overlaps PO #0 in frequency domain, and RO #0 to RO #5 all can be determined as PRACH time-frequency resources for sending the random access preamble. When determining a PRACH time-frequency resource that does not overlap the PUSCH time-frequency resource set in frequency domain and using the PRACH time-frequency resource as the PRACH time-frequency resource for sending the random access preamble, the terminal device may select a PRACH time-frequency resource, such as RO #3, from RO #0 to RO #5, where RO #3 does not overlap PO #0 in frequency domain, and determine RO #3 as the PRACH time-frequency resource for sending the random access preamble. Alternatively, the terminal device may first determine, in RO #0 to RO #5, PRACH time-frequency resources that do not overlap PO #0 in frequency domain, that is, RO #0 to RO #5; and then select a PRACH time-frequency resource from RO #0 to RO #5 and determine the PRACH time-frequency resource as the PRACH time-frequency resource for sending the random access preamble.

Time Domain Dimension and Frequency Domain Dimension

Further, the terminal device may alternatively determine, in both the time domain dimension and the frequency domain dimension, a PRACH time-frequency resource in the PRACH time-frequency resource set and use the PRACH time-frequency resource as the PRACH time-frequency resource for sending the random access preamble.

For example, the terminal device may determine, in the PRACH time-frequency resource set, a PRACH time-frequency resource that does not overlap any PUSCH time-frequency resource in the PUSCH time-frequency resource set in time domain and frequency domain at the same time and use the PRACH time-frequency resource as the PRACH time-frequency resource for sending the random access preamble. FIG. 7 is still used as an example. Although RO #4 overlaps PO #0 in time domain, RO #4 does not overlap PO #0 in frequency domain, and RO #4 may still be determined as the PRACH time-frequency resource for sending the random access preamble.

Referring to FIG. 1 and FIG. 6, it is assumed that the PRACH time-frequency resource set and the PUSCH time-frequency resource set configured by the terminal device are shown in FIG. 6. According to the random access preamble sending method provided in the embodiments, none of a terminal device 1, a terminal device 2, and a terminal device 3 determines RO #4 and RO #5 that each overlap the PUSCH time-frequency resource set (PO #0) in time domain and frequency domain, as PRACH time-frequency resources for sending the random access preamble, and sends the random access preamble on RO #4 and RO #5. This avoids a problem that a conflict exists between a PRACH time-frequency resource occupied by a terminal device for sending a random access preamble and a PUSCH time-frequency resource occupied by another terminal device for sending uplink data.

In addition, if an interval between a PRACH time-frequency resource for sending the random access preamble and a PUSCH time-frequency resource occupied for sending the uplink data is excessively small in time domain, the problem that a conflict exists between a PRACH time-frequency resource occupied for sending a random access preamble and a PUSCH time-frequency resource occupied for sending uplink data may also be caused.

(Implementation 2)

Therefore, in another implementation, the terminal device may select, from the PUSCH time-frequency resource set, a PRACH time-frequency resource that has an interval greater than or equal to a first threshold in time domain; or may select, from the PUSCH time-frequency resource set, a PRACH time-frequency resource that has an interval greater than or equal to a second threshold in time domain and that does not overlap the PUSCH time-frequency resource set in frequency domain, and use the PRACH time-frequency resource as the PRACH time-frequency resource for sending the random access preamble.

The first threshold and the second threshold may be the same or may be different. The first threshold and the second threshold may be predefined in the terminal device or may be configured by the terminal device based on a message, such as a broadcast message or a multicast message, that is sent by the network device and that includes the first threshold and/or the second threshold.

Time Domain Dimension:

The terminal device determines, in the PRACH time-frequency resource set, a PRACH time-frequency resource that has an interval greater than a first threshold from the PUSCH time-frequency resource set in time domain.

In a possible implementation, the terminal device may select a PRACH time-frequency resource from the PRACH time-frequency resource set, and determine whether the selected PRACH time-frequency resource has the interval greater than the first threshold from the PUSCH time-frequency resource set in time domain, and if yes, determines the selected PRACH time-frequency resource as the PRACH time-frequency resource for sending the random access preamble; or if not, reselects a PRACH time-frequency resource from unselected PRACH time-frequency resources in the PRACH time-frequency resource set, and returns to the step of determining whether the selected PRACH time-frequency resource has the interval greater than the first threshold from the PUSCH time-frequency resource set in time domain, until the selected PRACH time-frequency resource has the interval greater than the first threshold from the PUSCH time-frequency resource set in time domain and the terminal device determines the selected PRACH time-frequency resource as the PRACH time-frequency resource for sending the random access preamble.

In another possible implementation, the terminal device may first determine all PRACH time-frequency resources that are in the PRACH time-frequency resource set and that each have the interval greater than the first threshold from the PUSCH time-frequency resource set in time domain; and then select a PRACH time-frequency resource from all the determined PRACH time-frequency resources that are in the PRACH time-frequency resource set and that each have the interval greater than the first threshold from the PUSCH time-frequency resource set in time domain, and determine the PRACH time-frequency resource as the PRACH time-frequency resource for sending the random access preamble.

Figure 8:
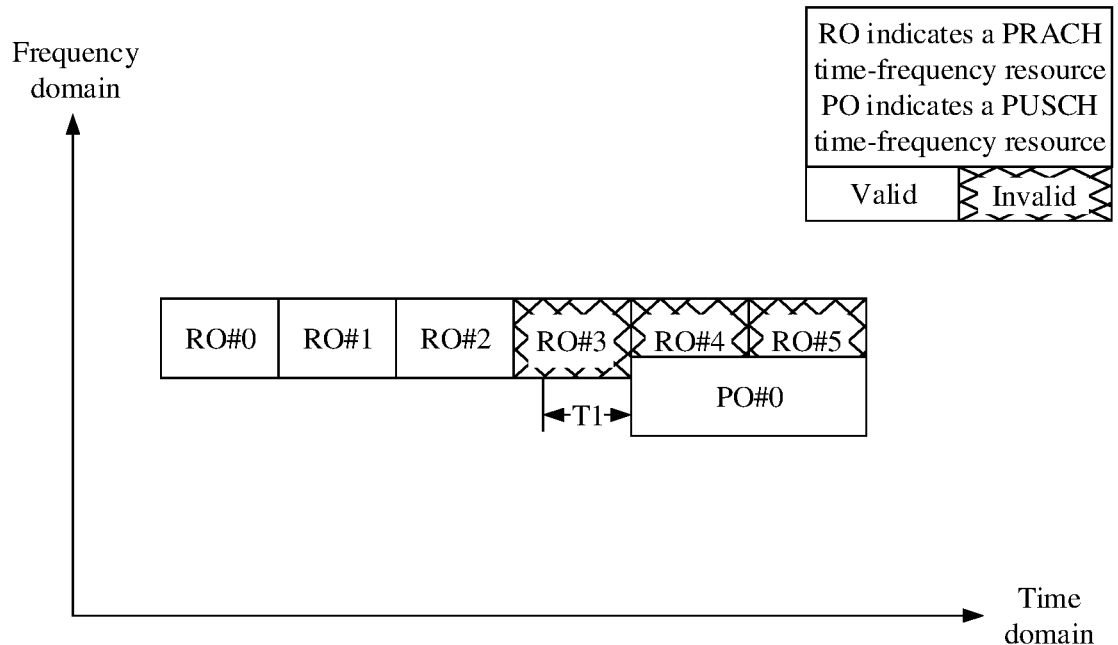
FIG. 8 is a fourth schematic diagram of distribution of a PRACH time-frequency resource and a PUSCH time-frequency resource according to an embodiment.

For example, descriptions are provided by using an example in which six PRACH time-frequency resources configured by the network device in one PRACH slot form a PRACH time-frequency resource set, and one PUSCH time-frequency resource configured by the network device forms a PUSCH time-frequency resource. As shown in FIG. 8, the six PRACH time-frequency resources are respectively RO #0 to RO #5, and the one PUSCH time-frequency resource is PO #0. An interval between each of RO #3, RO #4, and RO #5 and PO #0 is not greater than a first threshold (T1) in time domain, and RO #3, RO #4, and RO #5 cannot be determined as PRACH time-frequency resources for sending the random access preamble. When determining a PRACH time-frequency resource that has the interval greater than the first threshold from the PUSCH time-frequency resource set in time domain and using the PRACH time-frequency resource as the PRACH time-frequency resource for sending the random access preamble, the terminal device may select a PRACH time-frequency resource, such as RO #0, from RO #0 to RO #5, where RO #0 has the interval greater than the first threshold from PO #0 in time domain, and determine RO #0 as the PRACH time-frequency resource for sending the random access preamble. Alternatively, the terminal device may first determine, in RO #0 to RO #5, PRACH time-frequency resources that each have the interval greater than the first threshold from PO #0 in time domain, that is, RO #0 to RO #2; and then select a PRACH time-frequency resource from RO #0 to RO #2 and determine the PRACH time-frequency resource as the PRACH time-frequency resource for sending the random access preamble.

Time Domain Dimension and Frequency Domain Dimension

The terminal device determines, in the PRACH time-frequency resource set, a PRACH time-frequency resource that has an interval greater than a second threshold from the PUSCH time-frequency resource set in time domain and that does not overlap the PUSCH time-frequency resource set in frequency domain.

In a possible implementation, the terminal device may select a PRACH time-frequency resource from the PRACH time-frequency resource set, and determine whether the selected PRACH time-frequency resource has the interval greater than the second threshold from the PUSCH time-frequency resource set in time domain and does not overlap the PUSCH time-frequency resource set in frequency domain, and if yes, determines the selected PRACH time-frequency resource as the PRACH time-frequency resource for sending the random access preamble; or if not, reselects a PRACH time-frequency resource from unselected PRACH time-frequency resources in the PRACH time-frequency resource set, and returns to the step of determining whether the selected PRACH time-frequency resource has the interval greater than the second threshold from the PUSCH time-frequency resource set in time domain and does not overlap the PUSCH time-frequency resource set in frequency domain, until the selected PRACH time-frequency resource has the interval greater than the second threshold from the PUSCH time-frequency resource set in time domain and does not overlap the PUSCH time-frequency resource set in frequency domain and the terminal device determines the selected PRACH time-frequency resource as the PRACH time-frequency resource for sending the random access preamble.

In another possible implementation, the terminal device may first determine all PRACH time-frequency resources that are in the PRACH time-frequency resource set and that each have the interval greater than the second threshold from the PUSCH time-frequency resource set in time domain and do not overlap the PUSCH time-frequency resource set in frequency domain; and then select a PRACH time-frequency resource from all the determined PRACH time-frequency resources that are in the PRACH time-frequency resource set and that each have the interval greater than the second threshold from the PUSCH time-frequency resource set in time domain and do not overlap the PUSCH time-frequency resource set in frequency domain, and determine the PRACH time-frequency resource as the PRACH time-frequency resource for sending the random access preamble.

Figure 9:
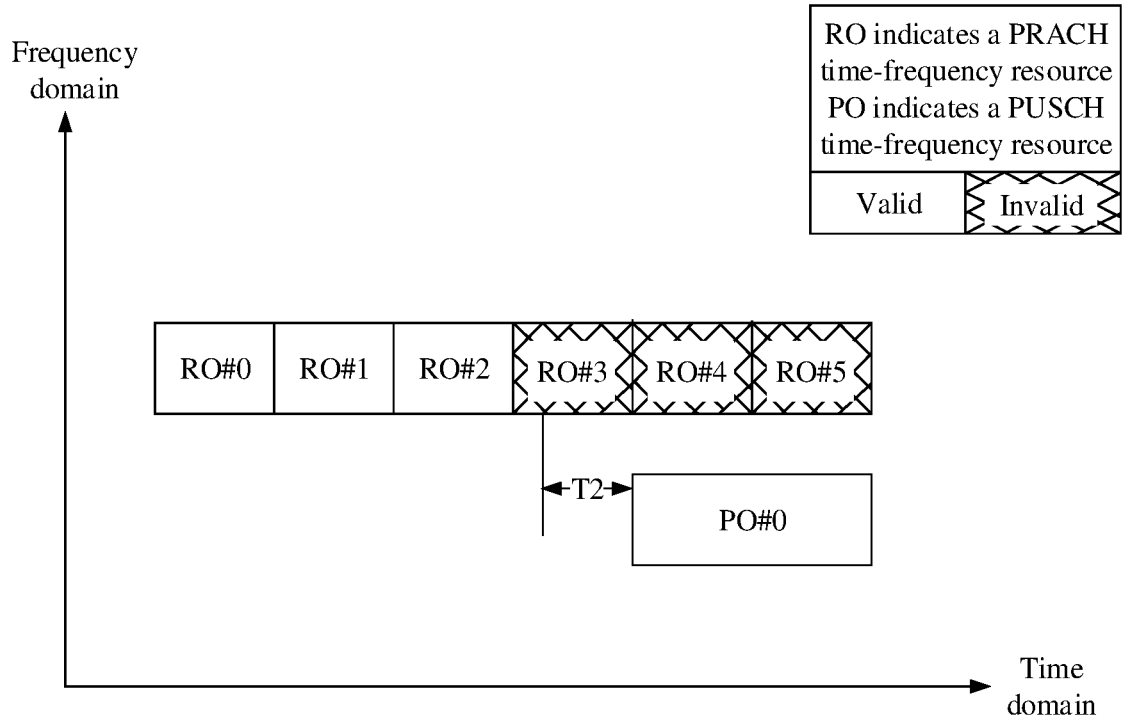
FIG. 9 is a fifth schematic diagram of distribution of a PRACH time-frequency resource and a PUSCH time-frequency resource according to an embodiment.

For example, descriptions are provided by using an example in which six PRACH time-frequency resources configured by the network device in one PRACH slot form a PRACH time-frequency resource set, and one PUSCH time-frequency resource configured by the network device forms a PUSCH time-frequency resource. As shown in FIG. 9, the six PRACH time-frequency resources are respectively RO #0 to RO #5, and the one PUSCH time-frequency resource is PO #0. None of RO #0 to RO #2 overlaps PO #0 in frequency domain, RO #0 to RO #2 each have the interval greater than second threshold (T2) from PO #0 in time domain, and RO #0 to RO #2 can all be determined as PRACH time-frequency resources for sending the random access preamble. When determining a PRACH time-frequency resource that has the interval greater than the second threshold from the PUSCH time-frequency resource set in time domain and that does not overlap the PUSCH time-frequency resource set in frequency domain, and using the PRACH time-frequency resource as the PRACH time-frequency resource for sending the random access preamble, the terminal device may select, from RO #0 to RO #5, a PRACH time-frequency resource, such as RO #3, where RO #3 does not overlap PO #0 in frequency domain, but has an interval not greater than the second threshold from PO #0 in time domain; and the terminal device reselects, from RO #0, RO #1, RO #2, RO #4, and RO #5, a PRACH time-frequency resource, such as RO #1, where RO #1 does not overlap PO #0 in frequency domain, and has an interval greater than the second threshold from PO #0 in time domain, and determines RO #1 as the PRACH time-frequency resource for sending the random access preamble. Alternatively, the terminal device may first determine, in RO #0 to RO #5, PRACH time-frequency resources that each have the interval greater than the second threshold from PO #0 in time domain and that each do not overlap PO #0 in frequency domain, that is, RO #0 to RO #2; and then select a PRACH time-frequency resource from RO #0 to RO #2, and determine the PRACH time-frequency resource as the PRACH time-frequency resource for sending the random access preamble.

In addition, generally, when a subcarrier spacing of the PRACH time-frequency resource set is different from a subcarrier spacing of the PUSCH time-frequency resource set, that is, when a subcarrier spacing of the PRACH time-frequency resources in the PRACH time-frequency resource set is different from a subcarrier spacing of the PUSCH time-frequency resources in the PUSCH time-frequency resource set, the network device may need time to adjust a reception parameter and the like. Therefore, when the subcarrier spacing of the PRACH time-frequency resource set is the same as the subcarrier spacing of the PUSCH time-frequency resource set, without considering whether a PRACH time-frequency resource has an interval greater than a threshold from the PUSCH time-frequency resource set in time domain, the terminal device may use the method in the implementation 1 to determine, in the PRACH time-frequency resource set, a PRACH time-frequency resource that does not conflict with the PUSCH time-frequency resource set, and use the PRACH time-frequency resource as the PRACH time-frequency resource for sending the random access preamble. When the subcarrier spacing of the PRACH time-frequency resource set is different from the subcarrier spacing of the PUSCH time-frequency resource set, considering whether a PRACH time-frequency resource has an interval greater than a threshold from the PUSCH time-frequency resource set in time domain, the terminal device may use the method in the implementation 2 to determine, in the PRACH time-frequency resource set, a PRACH time-frequency resource that does not conflict with the PUSCH time-frequency resource set, and use the PRACH time-frequency resource as the PRACH time-frequency resource for sending the random access preamble. Information about the subcarrier spacing of the PRACH time-frequency resource set and the subcarrier spacing of the PUSCH time-frequency resource set may be carried in the configuration information of the PRACH time-frequency resource set and the configuration information of the PUSCH time-frequency resource set, and obtained by the terminal device from the configuration information of the PRACH time-frequency resource set and the configuration information of the PUSCH time-frequency resource set.

Embodiment 2

Figure 10:
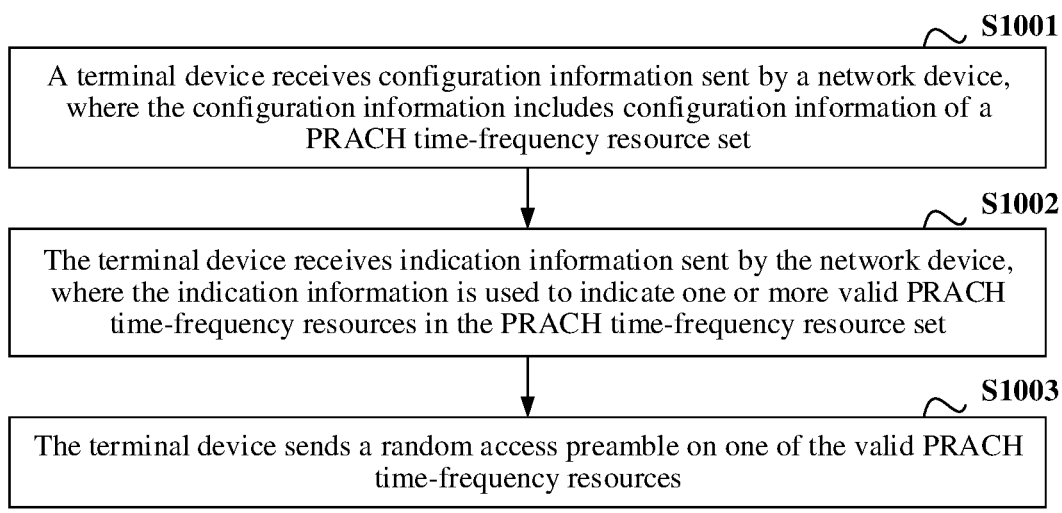
FIG. 10 is a second schematic diagram of a random access preamble sending process according to an embodiment.

FIG. 10 is a schematic diagram of a random access preamble sending process according to an embodiment. The process includes the following steps.

S1001: A terminal device receives configuration information sent by a network device, where the configuration information includes configuration information of a PRACH time-frequency resource set. The PRACH time-frequency resource set includes at least one PRACH time-frequency resource.

S1002: The terminal device receives indication information sent by the network device, where the indication information is used to indicate one or more valid PRACH time-frequency resources in the PRACH time-frequency resource set.

It should be understood that a sequence of S1001 and S1002 in this embodiment does not limit a sequence of sending the configuration information and sending the indication information by the network device. The network device may simultaneously send the configuration information and the indication information or may first send the configuration information and then send the indication information, or may first send the indication information and then send the configuration information.

S1003: The terminal device sends a random access preamble on one of the valid PRACH time-frequency resources.

In this embodiment, for the configuration information of the PRACH time-frequency resource set, refer to descriptions in Embodiment 1. Repeated descriptions are not provided again.

To ensure that receiving of the random access preamble does not affect another service of the network device, for example, does not affect receiving of uplink data sent (carried) by using a PUSCH time-frequency resource, the network device further sends, to the terminal device, the indication information used to indicate the valid PRACH time-frequency resources in the PRACH time-frequency resource set, to indicate the terminal device to send the random access preamble only on the PRACH time-frequency resource that is indicated as valid.

For example, the network device may send the indication information to the terminal device by using a broadcast or multicast message, an RRC message, or the like. After receiving the indication information sent by the network device, the terminal device determines, based on the indication information, the valid PRACH time-frequency resources in the PRACH time-frequency resource set configured based on the configuration information.

In this embodiment, the indication information may include a first bitmap, an index number, or a parameter N; or may include a second bitmap or a parameter K, provided that the valid PRACH time-frequency resources in the PRACH time-frequency resource set can be indicated. The following provides descriptions with reference to specific implementations.

Manner 1: The indication information includes the first bitmap, the index number, or the parameter N, and is used to indicate the terminal device to determine one or more valid PRACH time-frequency resources in a same PRACH slot in the PRACH time-frequency resource set.

(1) The indication information includes the first bitmap, and the first bitmap is used to indicate time-domain distribution of one or more valid PRACH time-frequency resources in a same PRACH slot in the PRACH time-frequency resource set.

Figure 11:
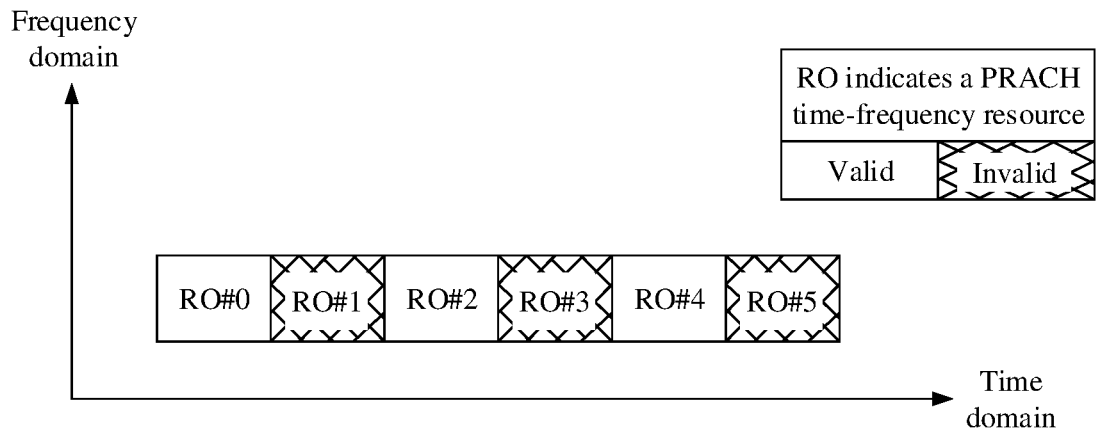
FIG. 11 is a first schematic diagram of PRACH time-frequency resource distribution according to an embodiment.

In a possible implementation, a length of the first bitmap is not less than a maximum quantity of PRACH time-frequency resources in time domain in one PRACH slot. A $1^{st}$ bit of the first bitmap indicates whether a $1^{st}$ PRACH time-frequency resource in time domain in the same PRACH slot in the PRACH time-frequency resource set is valid, a $2^{nd}$ bit of the first bitmap indicates whether a $2^{nd}$ PRACH time-frequency resource in time domain in the same PRACH slot in the PRACH time-frequency resource set is valid, and so on. For example, 1 may be used to indicate that a PRACH time-frequency resource corresponding to 1 is valid, and 0 may be used to indicate that a PRACH time-frequency resource corresponding to 0 is invalid. The terminal device can send the random access preamble only on the valid PRACH time-frequency resource. For example, in the configuration information sent by the network device, six PRACH time-frequency resources are configured in each PRACH slot, that is, there are six PRACH time-frequency resources in a same PRACH slot in the PRACH time-frequency resource set. As shown in FIG. 11, there are six PRACH time-frequency resources in the same PRACH slot that are sequentially RO #0 to RO #5, and the first bitmap included in the indication information configured by the network device is 101010. In this case, the terminal device determines, in the slot, that RO #0, RO #2, and RO #4 are valid PRACH time-frequency resources and may be used to send the random access preamble.

(2) The indication information includes the parameter N, and the parameter N is used to indicate that in one or more PRACH time-frequency resources in a same PRACH slot in the PRACH time-frequency resource set, first N or last N PRACH time-frequency resources in time domain are valid or invalid.

Figure 12:
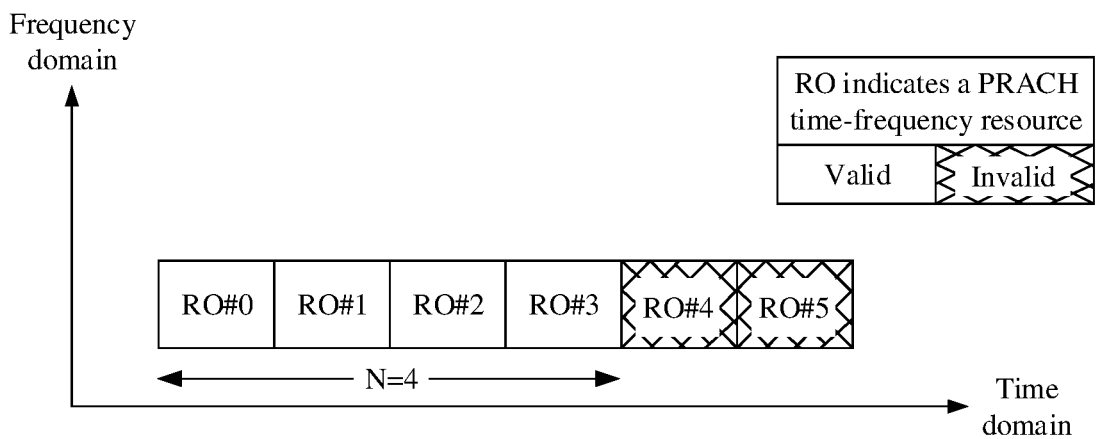
FIG. 12 is a second schematic diagram of PRACH time-frequency resource distribution according to an embodiment.

In a possible implementation, the parameter N is used to indicate that in the PRACH time-frequency resources in the same PRACH slot in the PRACH time-frequency resource set, the first N PRACH time-frequency resources or the last N PRACH time-frequency resources in time domain are valid. For example, the parameter N is used to indicate that in the PRACH time-frequency resources in the same PRACH slot in the PRACH time-frequency resource set, the first N PRACH time-frequency resources in time domain are valid. N=4, and there are six PRACH time-frequency resources in a PRACH slot in the PRACH time-frequency resource set. Referring to FIG. 12, six PRACH time-frequency resources in a same PRACH slot are sequentially RO #0 to RO #5. The terminal device determines, in the PRACH slot, that first four PRACH time-frequency resources are valid. In other words, the terminal device determines that RO #0 to RO #3 are valid PRACH time-frequency resources and may be used to send the random access preamble.

Figure 13:
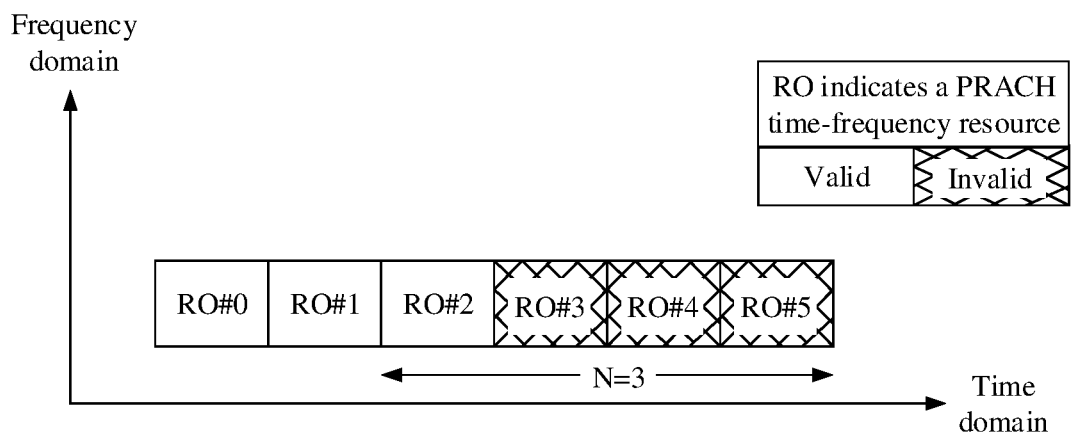
FIG. 13 is a third schematic diagram of PRACH time-frequency resource distribution according to an embodiment.

In a possible implementation, the parameter N is used to indicate that in PRACH time-frequency resources in a same PRACH slot in the PRACH time-frequency resource set, first N PRACH time-frequency resources or last N PRACH time-frequency resources in time domain are invalid. In this case, the terminal device considers by default that a PRACH time-frequency resource that is not indicated as invalid in the PRACH time-frequency resource set is valid. For example, the parameter N is used to indicate that in the PRACH time-frequency resources in the same PRACH slot in the PRACH time-frequency resource set, the last N PRACH time-frequency resources in time domain are invalid. N=3, and referring to FIG. 13, six PRACH time-frequency resources in a same PRACH slot are sequentially RO #0 to RO #5. The terminal device determines, in the PRACH slot, that last three PRACH time-frequency resources are invalid, and determines that RO #0 to RO #2 in the PRACH slot are valid PRACH time-frequency resources and may be used to send the random access preamble.

(3) The indication information includes the index number, and the index number is used to indicate an entry in a PRACH time-frequency resource table, and any entry in the PRACH time-frequency resource table is used to define a PRACH time-frequency resource that is valid in time domain and that is in one or more PRACH time-frequency resources in a same PRACH slot in the PRACH time-frequency resource set.

In a possible implementation, a PRACH time-frequency resource table is predefined in the network device and the terminal device, or a PRACH time-frequency resource table is configured by the network device and is sent to the terminal device by using a message such as a broadcast or multicast message. Each entry in the PRACH time-frequency resource table is used for a valid PRACH time-frequency resource in time domain in one or more PRACH time-frequency resources in a same PRACH slot in a PRACH time-frequency resource set. Each entry corresponds to one unique index number. An example in which a maximum quantity of PRACH time-frequency resources configured in a PRACH slot is six is used. A PRACH time-frequency resource table is shown as follows:

Referring to the PRACH time-frequency resource table, if the index number included in the indication information is 0, the terminal device determines that in the PRACH time-frequency resources in the same PRACH slot in the PRACH time-frequency resources, in time domain, the $1^{st}$ PRACH time-frequency resource is valid, the $2^{nd}$ PRACH time-frequency resource is invalid, the $3^{rd}$ PRACH time-frequency resource is valid, the $4^{th}$ PRACH time-frequency resource is invalid, the $5^{th}$ PRACH time-frequency resource is valid, and the $6^{th}$ PRACH time-frequency resource is invalid. If a quantity of PRACH time-frequency resources actually configured in a PRACH slot is less than a quantity of PRACH time-frequency resources configured in the PRACH time-frequency resource table, only a configuration indicating whether first M PRACH time-frequency resources configured in the PRACH time-frequency resource table are valid is used, where M is equal to the quantity of PRACH time-frequency resources actually configured in the PRACH slot.

Figure 14:
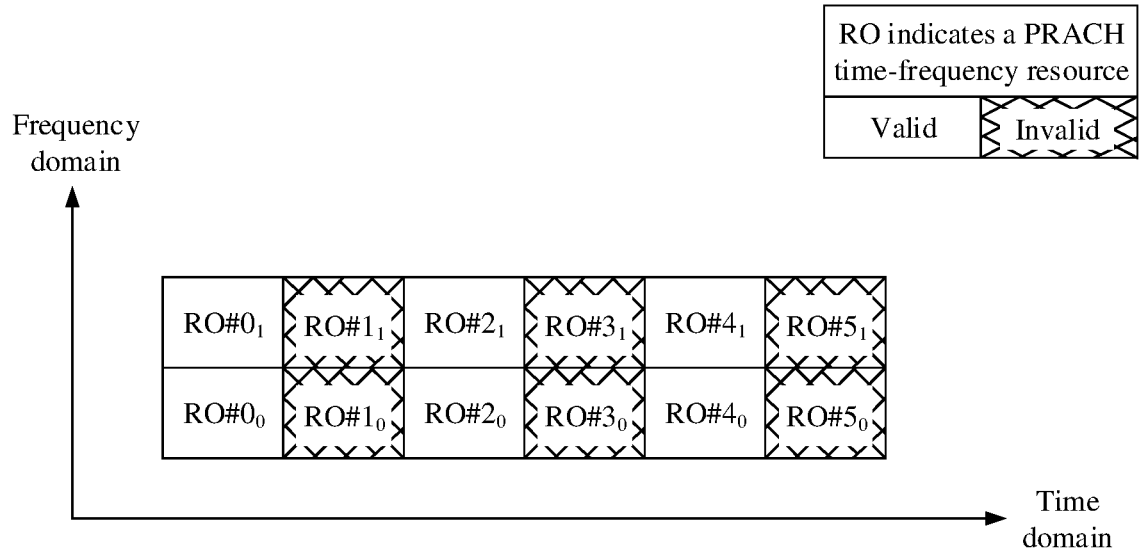
FIG. 14 is a fourth schematic diagram of PRACH time-frequency resource distribution according to an embodiment.

In addition, in the foregoing, the terminal device is indicated, by using the first bitmap, the index number, or the parameter N, to determine the valid PRACH time-frequency resources in the same PRACH slot in the PRACH time-frequency resource set, and the indication is performed all in time domain. Therefore, when PRACH time-frequency resource frequency division multiplexing is configured, that is, when two or more PRACH time-frequency resources may appear on a same time domain resource, in this embodiment, the indication information may be used for all PRACH time-frequency resources for the frequency division multiplexing that have a same time domain resource. In other words, when the PRACH time-frequency resource frequency division multiplexing is configured, the indication information indicates a valid PRACH time domain resource in the same PRACH slot, and all PRACH time-frequency resources on the PRACH time domain resource. A PRACH slot is used as an example. As shown in FIG. 14, in the PRACH slot, PRACH time-frequency resource frequency division multiplexing exists. On a time domain resource, when there are two PRACH time-frequency resources (RO #$0_0$ and RO #$0_1$) on a $1^{st}$ PRACH time domain resource, two PRACH time-frequency resources (RO #$1_0$ and RO #$1_1$) on a $2^{nd}$ PRACH time domain resource, and the like, if a first bitmap is 101010, it indicates that for the PRACH time-frequency resources in the same PRACH slot, in time domain, $1^{st}$ PRACH time-frequency resources are valid (RO #$0_0$ and RO #$0_1$), $2^{nd}$ PRACH time-frequency resources are invalid (RO #$1_0$ and RO #$1_1$), and so on.

Figure 15:
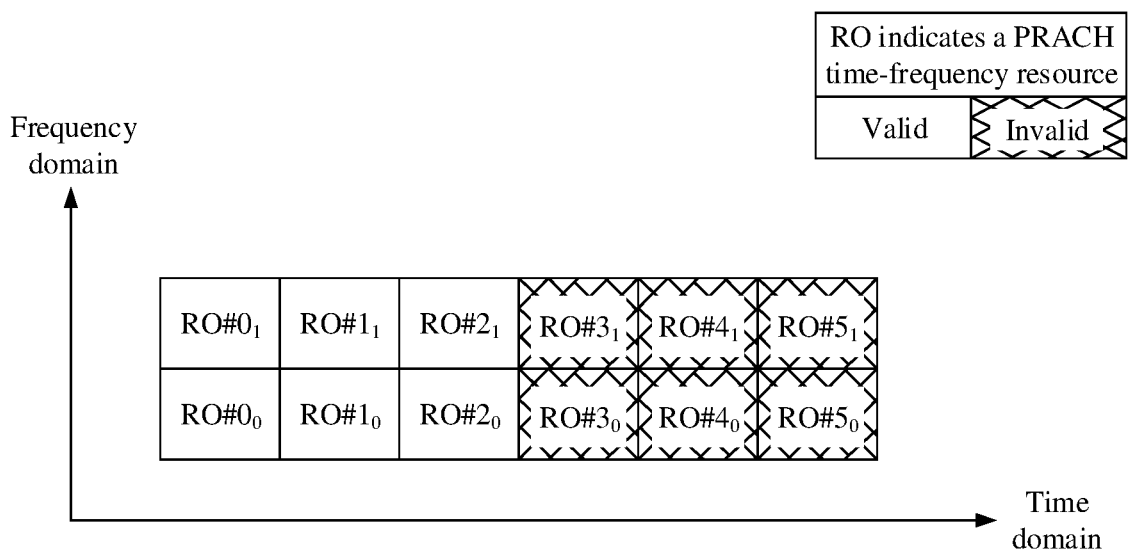
FIG. 15 is a fifth schematic diagram of PRACH time-frequency resource distribution according to an embodiment.

As shown in FIG. 15, in a PRACH slot, PRACH time-frequency resource frequency division multiplexing exists, and on a time domain resource, when there are two PRACH time-frequency resources (RO #$0_0$ and RO #$0_1$) on a $1^{st}$ PRACH time domain resource, two PRACH time-frequency

| Index | PRACH time-frequency resource table PRACH time-frequency resources in a PRACH slot | | | | | |
|---|---|---|---|---|---|---|
| (Index) | $1^{st}$ PRACH time-frequency resource | $2^{nd}$ PRACH time-frequency resource | $3^{rd}$ PRACH time-frequency resource | $4^{th}$ PRACH time-frequency resource | $5^{th}$ PRACH time-frequency resource | $6^{th}$ PRACH time-frequency resource |
| 0 | Valid | Invalid | Valid | Invalid | Valid | Invalid |
| 1 | Valid | Valid | Invalid | Invalid | Valid | Invalid |
| 2 | Valid | Valid | Valid | Invalid | Invalid | Invalid |
| 3 | Valid | Valid | Valid | Valid | Invalid | Invalid | resources (RO #$1_0$ and RO #$1_1$) on a $2^{nd}$ PRACH time domain resource, and the like, if a parameter N=3, and N indicates that first N PRACH time domain resources in time domain are valid in the PRACH time-frequency resources in the same PRACH slot, it indicates that for the PRACH time-frequency resources in the same PRACH slot, the PRACH time-frequency resources on the $1^{st}$ PRACH time-domain resource in time domain are valid (RO #$0_0$ and RO #$0_1$), the PRACH time-frequency resources on the $2^{nd}$ PRACH time-domain resource in time domain are valid (RO #$1_0$ and RO #$1_1$), PRACH time-frequency resources on a $3^{rd}$ PRACH time-domain resource in time domain are valid (RO #$2_0$ and RO #$2_1$), PRACH time-frequency resources on a $4^{th}$ PRACH time domain resource in time domain are invalid (RO #$3_0$ and RO #$3_1$), PRACH time-frequency resources on a 5th PRACH time domain resource in time domain are invalid (RO #$4_0$ and RO #$4_1$), and PRACH time-frequency resources on a $6^{th}$ PRACH time domain resource are invalid (RO #$5_0$ and RO #$5_1$).

Figure 16:
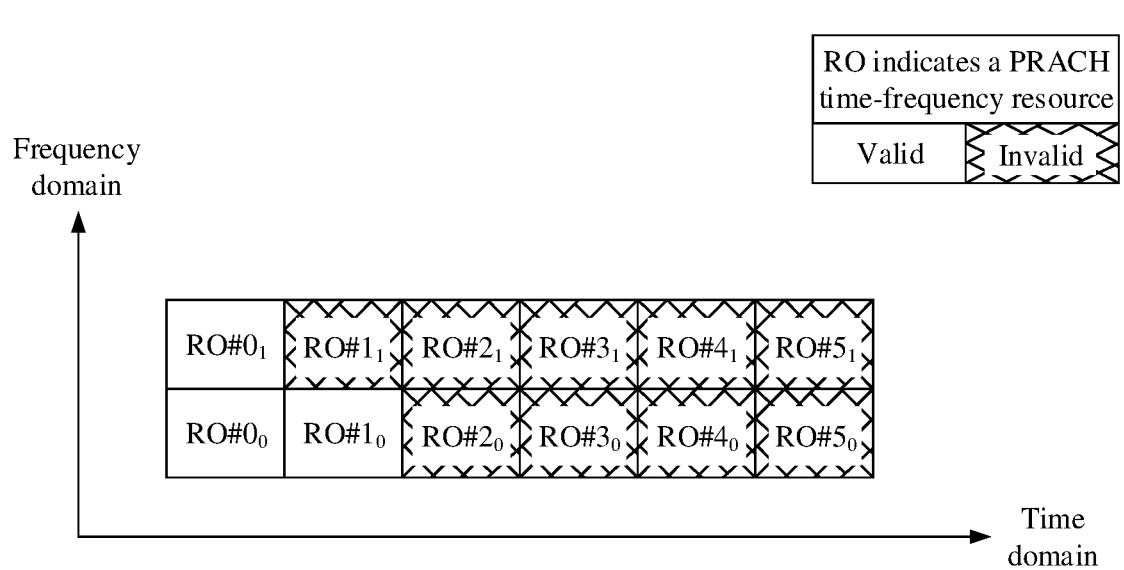
FIG. 16 is a sixth schematic diagram of PRACH time-frequency resource distribution according to an embodiment.

In another possible implementation, the parameter N is used to indicate that in PRACH time-frequency resources in a same PRACH slot in the PRACH time-frequency resource set, first N PRACH time-frequency resources or last N PRACH time-frequency resources in time-frequency domain are valid. For example, the parameter N is used to indicate that in the PRACH time-frequency resources in the same PRACH slot in the PRACH time-frequency resource set, the first N PRACH time-frequency resources in time-frequency domain are valid. N=3, and as shown in FIG. 16, in a PRACH slot, PRACH time-frequency resource frequency division multiplexing exists. On a time domain resource, when there are two PRACH time-frequency resources (RO #$0_0$ and RO #$0_1$) on a $1^{st}$ PRACH time domain resource, two PRACH time-frequency resources (RO #$1_0$ and RO #$1_1$) on a 2nd PRACH time domain resource, and the like, the PRACH time-frequency resources RO #$0_0$, RO #$0_1$, and RO #$1_0$ are valid, and the other PRACH time-frequency resources are invalid.

Figure 17:
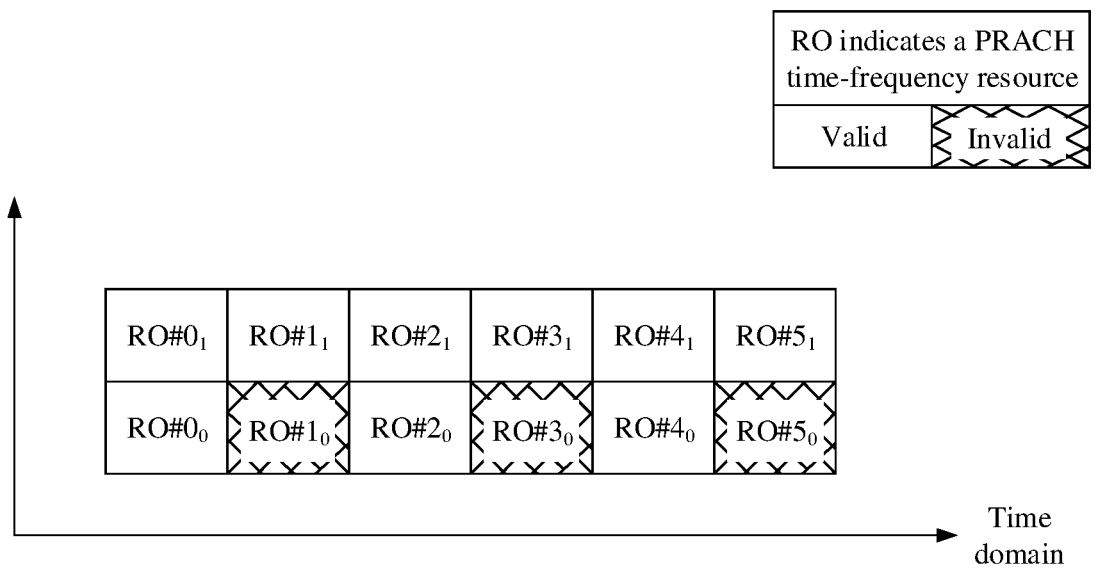
FIG. 17 is a seventh schematic diagram of PRACH time-frequency resource distribution according to an embodiment.

Further, when the PRACH time-frequency resource frequency division multiplexing is configured, that is, two or more PRACH time-frequency resources may appear on a same time domain resource, PRACH time-frequency resource indication information may be used only for a PRACH time-frequency resource in one or more frequency bands in the PRACH time-frequency resources. An application scope of the indication information in frequency domain may be predefined. For example, the indication information is applicable only to a PRACH time-frequency resource in a lowest frequency band. Alternatively, an application scope of the indication information in frequency domain is configured by the network device. For example, the network device may indicate the application scope of the indication information in frequency domain by using other signaling. The terminal device may consider by default that another PRACH time-frequency resource that is not indicated is valid, or invalid. As shown in FIG. 17, the indication information is applicable only to RO #$0_0$ to RO #$5_0$. The terminal device may consider by default that RO #$0_1$ to RO #$5_1$ that are not indicated are valid.

Manner 2: The indication information includes a second bitmap or a parameter K and is used to indicate the terminal device to determine one or more valid PRACH slots occupied by one or more PRACH time-frequency resources in a same radio frame in the PRACH time-frequency resource set.

(1) The indication information includes the second bitmap, and the second bitmap is used to indicate time-domain distribution of one or more valid PRACH slots occupied by one or more PRACH time-frequency resources in a same radio frame in the PRACH time-frequency resource set.

In a possible implementation, the length of the first bitmap is not less than a maximum quantity of PRACH slots in one radio frame. A Pt bit of the second bitmap indicates whether a Pt PRACH slot occupied by the PRACH time-frequency resources in the same radio frame in the PRACH time-frequency resource set is valid, a $2^{nd}$ bit of the second bitmap indicates whether a $2^{nd}$ PRACH slot occupied by the PRACH time-frequency resources in the same radio frame in the PRACH time-frequency resource set is valid, and so on. For example, 1 may be used to indicate that a PRACH slot corresponding to 1 is valid, and 0 may be used to indicate that a PRACH slot corresponding to 0 is invalid. The terminal device can determine, only in a PRACH slot that is indicated as valid, the PRACH time-frequency resource for sending the random access preamble. For example, the terminal device may consider by default that all PRACH time-frequency resources in a PRACH slot that is indicated as valid are valid and may be used for sending the random access preamble.

(2) The indication information includes the parameter K, and the parameter K is used to indicate that in one or more PRACH slots occupied by one or more PRACH time-frequency resources in a same radio frame in the PRACH time-frequency resource set, first K or last K PRACH slots in time domain are valid or invalid.

In a possible implementation, the parameter K is used to indicate that in the PRACH slots occupied by the PRACH time-frequency resources in the same radio frame in the PRACH time-frequency resource set, the first K or last K PRACH slots in time domain are valid. The terminal device can determine, only in a PRACH slot that is indicated as valid, the PRACH time-frequency resource for sending the random access preamble.

In another possible implementation, the parameter K is used to indicate that in the PRACH slots occupied by the PRACH time-frequency resources in the same radio frame in the PRACH time-frequency resource set, the first K or last K PRACH slots in time domain are invalid. The terminal device considers by default that, in the PRACH slots occupied by the PRACH time-frequency resources in the same radio frame in the PRACH time-frequency resource set, a PRACH slot that is not indicated as invalid in time domain is a valid PRACH slot. The PRACH time-frequency resource for sending the random access preamble can be determined only in a valid PRACH slot.

Based on Manner 2, the terminal device may determine a valid PRACH slot occupied by the PRACH time-frequency resources in the same radio frame in the PRACH time-frequency resource set, and the terminal device may directly determine all PRACH resources in the valid PRACH slot in the PRACH time-frequency resource set as valid PRACH time-frequency resources.

Optionally, the configuration information sent by the network device includes the second bitmap or the parameter K and is used to indicate the terminal device to determine a valid PRACH slot in the PRACH slots occupied by the PRACH time-frequency resources in the same radio frame in the PRACH time-frequency resource set (Manner 2). In addition, the configuration information further includes the first bitmap, the index number, or the parameter N, and is used to indicate the terminal device to determine a valid PRACH time-frequency resource in a PRACH slot that is indicated as valid in the PRACH time-frequency resource set. The terminal device can send the random access preamble only on the valid PRACH time-frequency resource in the valid PRACH slot.

Optionally, the configuration information sent by the network device includes the second bitmap or the parameter K and is used to indicate the terminal device to determine a valid PRACH slot in the PRACH slots occupied by the PRACH time-frequency resources in the same radio frame in the PRACH time-frequency resource set (Manner 2). The terminal device may consider by default that all PRACH time-frequency resources in a PRACH slot that is indicated as valid are valid. In addition, the configuration information further includes the first bitmap, the index number, or the parameter N, and is used to indicate the terminal device to determine a valid PRACH time-frequency resource in a PRACH slot that is not indicated as valid in the PRACH time-frequency resource set, so that the terminal device sends the random access preamble on the valid PRACH time-frequency resource.

Embodiment 3

Figure 18:
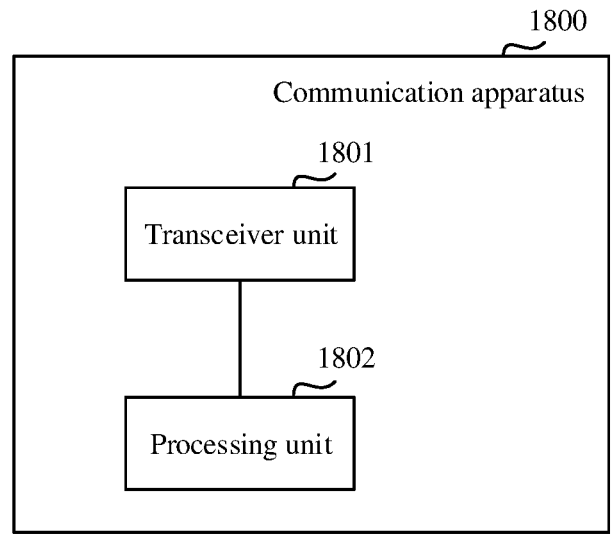
FIG. 18 is a schematic structural diagram of a communication apparatus according to an embodiment.

Based on a same concept as the foregoing random access preamble sending method, as shown in FIG. 18, an embodiment further provides a communication apparatus 1800. The communication apparatus 1800 may include a transceiver unit 1801 and a processing unit 1802.

In a possible implementation, the communication apparatus is configured to perform the steps performed by the terminal device in the first random access preamble sending method corresponding to FIG. 4.

For example, the transceiver unit 1801 is configured to receive configuration information sent by a network device, where the configuration information includes configuration information of a physical random access channel PRACH time-frequency resource set and configuration information of a physical uplink shared channel PUSCH time-frequency resource set.

The processing unit 1802 is configured to determine, in the PRACH time-frequency resource set, a PRACH time-frequency resource that does not conflict with the PUSCH time-frequency resource set.

The transceiver unit 1801 is further configured to send a random access preamble on the PRACH time-frequency resource determined by the processing unit 1802.

In a possible implementation, the processing unit 1802 uses one of the following manners to determine, in the PRACH time-frequency resource set, a PRACH time-frequency resource that does not conflict with the PUSCH time-frequency resource set:

determining, in the PRACH time-frequency resource set, a PRACH time-frequency resource that does not overlap the PUSCH time-frequency resource set in time domain; or determining, in the PRACH time-frequency resource set, a PRACH time-frequency resource that does not overlap the PUSCH time-frequency resource set in frequency domain.

In a possible implementation, when determining, in the PRACH time-frequency resource set, a PRACH time-frequency resource that does not overlap the PUSCH time-frequency resource set in time domain, the processing unit 1802 is configured to determine, in the PRACH time-frequency resource set, a PRACH time-frequency resource that has an interval greater than a first threshold from the PUSCH time-frequency resource set in time domain; and/or when determining, in the PRACH time-frequency resource set, a PRACH time-frequency resource that does not overlap the PUSCH time-frequency resource set in frequency domain, the processing unit 1802 is configured to determine, in the PRACH time-frequency resource set, a PRACH time-frequency resource that has an interval greater than a second threshold from the PUSCH time-frequency resource set in time domain and that does not overlap the PUSCH time-frequency resource set in frequency domain.

In a possible implementation, the processing unit 1802 is further configured to: before determining the PRACH time-frequency resource in the PRACH time-frequency resource set, determine that a subcarrier spacing of the PRACH time-frequency resource set is different from a subcarrier spacing of the PUSCH time-frequency resource set.

In a possible implementation, the communication apparatus is configured to perform the steps performed by the terminal device in the first random access preamble sending method corresponding to FIG. 10.

For example, the transceiver unit 1801 is configured to: receive configuration information sent by a network device, and receive indication information sent by the network device, where the configuration information includes configuration information of a physical random access channel PRACH time-frequency resource set, and the indication information is used to indicate one or more valid PRACH time-frequency resources in the PRACH time-frequency resource set.

The processing unit 1802 is configured to determine a PRACH time-frequency resource in the valid PRACH time-frequency resources in the PRACH time-frequency resource set.

The transceiver unit 1801 is further configured to send a random access preamble on the PRACH time-frequency resource determined by the processing unit 1802.

In a possible implementation, the indication information includes a first bitmap, an index number, or a parameter N, where the first bitmap is used to indicate time-domain distribution of one or more valid PRACH time-frequency resources in a same PRACH slot in the PRACH time-frequency resource set;

the parameter N is used to indicate that in one or more PRACH time-frequency resources in a same PRACH slot in the PRACH time-frequency resource set, first N or last N PRACH time-frequency resources in time domain are valid or invalid; and the index number is used to indicate an entry in a PRACH time-frequency resource table, and any entry in the PRACH time-frequency resource table is used to define a PRACH time-frequency resource that is valid in time domain and that is in one or more PRACH time-frequency resources in a same PRACH slot in the PRACH time-frequency resource set.

In a possible implementation, the indication information includes a second bitmap or a parameter K, where the second bitmap is used to indicate time-domain distribution of one or more valid PRACH slots occupied by one or more PRACH time-frequency resources in a same radio frame in the PRACH time-frequency resource set; and the parameter K is used to indicate that in one or more PRACH slots occupied by one or more PRACH time-frequency resources in a same radio frame in the PRACH time-frequency resource set, first K or last K PRACH slots in time domain are valid or invalid.

Figure 19:
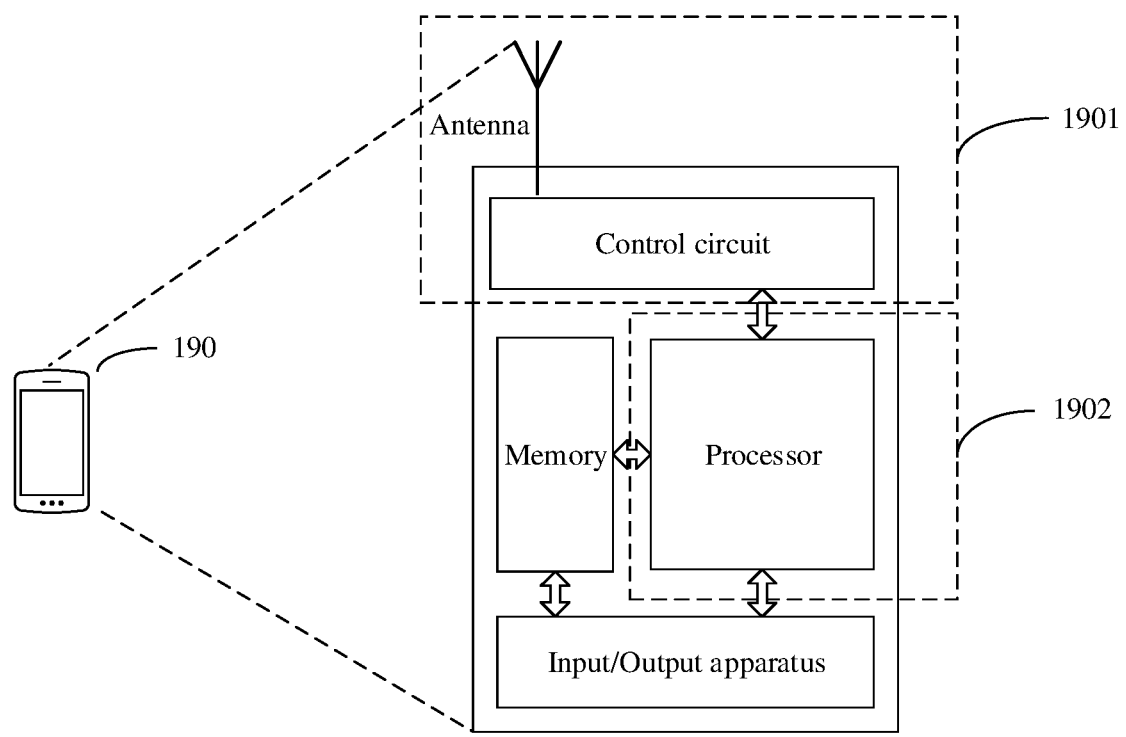
FIG. 19 is a schematic structural diagram of a terminal device according to an embodiment.

Based on a same concept as the foregoing random access preamble sending method, an embodiment further provides a terminal device. As shown in FIG. 19, the terminal device is applicable to the system shown in FIG. 1, to perform a function of the terminal device in the foregoing method embodiments. For ease of description, FIG. 19 shows only main components of the terminal device. As shown in FIG. 19, the terminal device 190 includes a processor, a memory, a control circuit, an antenna, and an input/output apparatus. The processor is configured to: process a communication protocol and communication data, control the entire terminal device, execute a software program, and process data of the software program. For example, the processor is configured to support the terminal device in performing the actions described in the foregoing method embodiments, for example, sending uplink data based on reference signal indication information. The memory is configured to store software program and data, for example, store a correspondence between the indication information described in the foregoing embodiments and combination information. The control circuit is configured to: perform conversion between a baseband signal and a radio frequency signal and process the radio frequency signal. A combination of the control circuit and the antenna may be referred to as a transceiver, configured to send and receive a radio frequency signal in an electromagnetic wave form. The input/output apparatus such as a touchscreen, a display, or a keyboard is configured to: receive data entered by a user, and output data to the user.

After the terminal device is powered on, the processor may read the software program in a storage unit, explain and execute instructions of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal outward in an electromagnetic wave form by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person of ordinary skill in the art may understand that for ease of description, FIG. 19 shows only one memory and only one processor. In an actual terminal device, there may be a plurality of processors and a plurality of memories. The memory may also be referred to as a storage medium, a storage device, or the like. This is not limited in the embodiments.

In an optional implementation, the processor may include a baseband processor and/or a central processing unit. The baseband processor is configured to process the communication protocol and the communication data. The central processing unit is configured to: control the entire terminal device, execute the software program, and process the data of the software program. Functions of the baseband processor and the central processing unit may be integrated into the processor in FIG. 19. A person skilled in the art may understand that the baseband processor and the central processing unit may be alternatively processors independent of each other and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor or may be stored in the storage unit in a form of a software program. The processor executes the software program to implement a baseband processing function.

In this embodiment, the antenna and the control circuit that have receiving and sending functions may be considered as a transceiver unit 1901 of the terminal device 190, for example, to support the terminal device in performing the receiving function and the sending function. The processor having a processing function is considered as a processing unit 1902 of the terminal device 190. As shown in FIG. 19, the terminal device 190 includes the transceiver unit 1901 and the processing unit 1902. The transceiver unit may also be referred to as a transceiver, a transceiver machine, a transceiver apparatus, or the like. Optionally, a device configured to implement a receiving function in the transceiver unit 1901 may be considered as a receiving unit, and a device configured to implement a sending function in the transceiver unit 1901 may be considered as a sending unit. In other words, the transceiver unit 1901 includes the receiving unit and the sending unit. The receiving unit may also be referred to as a receiving machine, an input port, a receiving circuit, or the like. The sending unit may be referred to as a transmitting machine, a transmitter, a transmitting circuit, or the like.

The processor 1902 may be configured to execute instructions stored in the memory, to control the transceiver unit 1901 to receive a signal and/or send a signal, to complete a function of the terminal device in the foregoing method embodiments. In an implementation, it may be considered that a function of the transceiver unit 1901 is implemented by using a transceiver circuit or a transceiver-dedicated chip.

Based on a same concept as the foregoing random access preamble sending method, an embodiment further provides a computer-readable medium. The storage medium stores computer instructions, and when the computer instructions are executed by a terminal device, the terminal device is enabled to implement the random access preamble sending method in any one of the foregoing method embodiments.

Based on a same concept as the foregoing random access preamble sending method, an embodiment further provides a computer program product. The computer program product includes computer instructions, and when the computer instructions are executed by a terminal device, the terminal device is enabled to implement the random access preamble sending method in any one of the foregoing method embodiments.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer instructions are loaded and executed on a computer, the procedures or functions according to the embodiments are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may be aware that, units, algorithms, and steps in the examples described with reference to the embodiments can be implemented by electronic hardware, computer software, or a combination thereof. To describe interchangeability between the hardware and the software, the foregoing has generally described compositions and steps of the examples based on functions. Whether the functions are performed by hardware or software depends on a particular application and a design constraint condition of a solution. A person of ordinary skill in the art may use different methods to implement the described functions for each particular application, but it should not be considered that the implementation goes beyond the scope.

A person of ordinary skill in the art may understand that, for the purpose of convenient and brief description, for detailed working processes of the foregoing system, apparatus, and unit, refer to corresponding processes in the foregoing method embodiments, and details are not described herein again.

In the several embodiments provided, it should be understood that the disclosed system, apparatus, and method may be implemented in other manners. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, displayed or discussed mutual couplings or direct couplings or communication connections may be indirect couplings or communication connections using some interfaces, apparatuses, or units, and may be connections in an electrical form, a mechanical form, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

With descriptions of the foregoing implementations, a person of ordinary skill in the art may understand that the embodiments may be implemented by using hardware, firmware, or a combination thereof. When the embodiments implemented by using software, the foregoing functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, and the coaxial cable, optical fiber/cable, twisted pair, DSL or wireless technologies such as infrared ray, radio, and microwave are included in a definition of a medium to which they belong. A disk and a disc used in the embodiments include a compact disc (CD), a laser disc, an optical disc, a digital versatile disc (DVD), a floppy disk, and a Blu-ray disc. The disk usually copies data in a magnetic manner, whereas the disc copies data optically through a laser. The foregoing combination shall also be included in the protection scope of the computer-readable medium.

Therefore, the foregoing descriptions are merely example embodiments of the solutions, but are non-limiting. Any modification, equivalent replacement, or improvement made without departing from the spirit and principle of the embodiments shall fall in the scope of the embodiments.

What is claimed is:

1. A random access preamble sending method, comprising:
    receiving, by a communication apparatus, configuration information from a network device, wherein the configuration information comprises configuration information of a physical random access channel (PRACH) time-frequency resource set;
    receiving, by the communication apparatus, indication information from the network device, wherein the indication information indicates one or more valid PRACH time-frequency resources in the PRACH time-frequency resource set that do not conflict with a PUSCH time-frequency resource set, wherein the indication information comprises an index number, wherein the index number indicates an entry in a PRACH time-frequency resource table, and wherein any entry in the PRACH time-frequency resource table defines a PRACH time-frequency resource that is valid in time domain and that is in one or more PRACH time-frequency resources in the PRACH time-frequency resource set; and
    sending, by the communication apparatus, a random access preamble on one of the valid PRACH time-frequency resources.

2. The random access preamble sending method according to claim 1, wherein the indication information comprises a second bitmap or a parameter K, the second bitmap indicates time-domain distribution of one or more valid PRACH slots occupied by one or more PRACH time-frequency resources in a same radio frame in the PRACH time-frequency resource set; and the parameter K indicates that in one or more PRACH slots occupied by one or more PRACH time-frequency resources in a same radio frame in the PRACH time-frequency resource set, first K or last K PRACH slots in time domain are valid or invalid.

3. The random access preamble sending method according to claim 1, further comprising determining that the one or more valid PRACH time-frequency resources in the PRACH time-frequency resource set do not conflict with a physical uplink shared channel (PUSCH) time-frequency resource set based on a first threshold applicable to the PRACH time-frequency resource set and a second threshold applicable to the PUSCH time-frequency resource set, wherein the first threshold and second threshold are one of:
predetermined by the communication apparatus; and
received by the communication apparatus in a message.

4. The random access preamble sending method according to claim 1, further comprising:
determining, by the communication apparatus, the one or more valid PRACH time-frequency resources by:
comparing the PRACH time-frequency resource set with a physical uplink shared channel (PUSCH) time-frequency resource set in a frequency domain;
identifying a non-conflicting PRACH time-frequency resource that does not overlap the PUSCH time-frequency resource set in frequency domain; and
setting the non-conflicting PRACH time-frequency resource as the one of the valid PRACH time-frequency resources.

5. A communication apparatus, comprising:
at least one processor configured with processor-executable instructions to perform operations comprising:
receiving configuration information from a network device, and receiving indication information from the network device, wherein the configuration information comprises configuration information of a physical random access channel (PRACH) time-frequency resource set that do not conflict with a PUSCH time-frequency resource set, and the indication information indicates one or more valid PRACH time-frequency resources in the PRACH time-frequency resource set, wherein the indication information comprises an index number, wherein the index number indicates an entry in a PRACH time-frequency resource table, and wherein any entry in the PRACH time-frequency resource defines a PRACH time-frequency resource that is valid in time domain and that is in one or more PRACH time-frequency resources in the PRACH time-frequency resource set; and
sending a random access preamble on one of the valid PRACH time-frequency resources.

6. The communication apparatus according to claim 5, wherein the indication information comprises a second bitmap or a parameter K,
the second bitmap indicates time-domain distribution of one or more valid PRACH slots occupied by one or more PRACH time-frequency resources in a same radio frame in the PRACH time-frequency resource set; and
the parameter K indicates that in one or more PRACH slots occupied by one or more PRACH time-frequency resources in a same radio frame in the PRACH time-frequency resource set, first K or last K PRACH slots in time domain are valid or invalid.

7. The communication apparatus according to claim 5, wherein the at least one processor is further configured with processor-executable instructions to perform operations comprising:
determining that the one or more valid PRACH time-frequency resources in the PRACH time-frequency resource set do not conflict with a physical uplink shared channel (PUSCH) time-frequency resource set based on a first threshold applicable to the PRACH time-frequency resource set and a second threshold applicable to the PUSCH time-frequency resource set, wherein the first threshold and second threshold are one of:
predetermined by the communication apparatus; and
received by the communication apparatus in a message.

8. The communication apparatus according to claim 5, wherein the at least one processor configured with processor-executable instructions to perform operations comprising:
determining the one or more valid PRACH time-frequency resources by:
comparing the PRACH time-frequency resource set with a physical uplink shared channel (PUSCH) time-frequency resource set in a frequency domain;
identifying a non-conflicting PRACH time-frequency resource that does not overlap the PUSCH time-frequency resource set in frequency domain; and
setting the non-conflicting PRACH time-frequency resource as the one of the valid PRACH time-frequency resources.

9. A non-transitory computer-readable storage medium comprising instructions which, when executed by a computer, cause the computer to carry out:
receiving configuration information from a network device, wherein the configuration information comprises configuration information of a physical random access channel (PRACH) time-frequency resource set;
receiving indication information from the network device, wherein the indication information indicates one or more valid PRACH time-frequency resources in the PRACH time-frequency resource set that do not conflict with a PUSCH time-frequency resource set, wherein the indication information comprises an index number, wherein the index number indicates an entry in a PRACH time-frequency resource table, and wherein any entry in the PRACH time-frequency resource table defines a PRACH time-frequency resource that is valid in time domain and that is in one or more PRACH time-frequency resources in the PRACH time-frequency resource set; and
sending a random access preamble on one of the valid PRACH time-frequency resources.

10. The non-transitory computer-readable storage medium according to claim 9, wherein the indication information comprises a second bitmap or a parameter K,
the second bitmap indicates time-domain distribution of one or more valid PRACH slots occupied by one or more PRACH time-frequency resources in a same radio frame in the PRACH time-frequency resource set; and
the parameter K indicates that in one or more PRACH slots occupied by one or more PRACH time-frequency resources in a same radio frame in the PRACH time-frequency resource set, first K or last K PRACH slots in time domain are valid or invalid.

11. The non-transitory computer-readable storage medium according to claim 9, wherein the instructions further cause the computer to carry out determining that the one or more valid PRACH time-frequency resources in the PRACH time-frequency resource set do not conflict with a physical uplink shared channel (PUSCH) time-frequency resource set based on a first threshold applicable to the PRACH time-frequency resource set and a second threshold applicable to the PUSCH time-frequency resource set, wherein the first threshold and second threshold are one of:
   predetermined by the communication apparatus; and
   received by the communication apparatus in a message.

* * * * *